United States Patent
Weiss et al.

(10) Patent No.: US 10,560,324 B2
(45) Date of Patent: Feb. 11, 2020

(54) SYSTEM AND METHOD FOR ENABLING USER DEVICE CONTROL

(71) Applicant: WaveMarket, Inc., Emeryville, CA (US)

(72) Inventors: Andrew Weiss, San Ramon, CA (US); Scott Hotes, Berkeley, CA (US); Joseph Anakata, Alameda, CA (US); Eric Schuchman, San Francisco, CA (US); Mitchell Scott Ozer, San Francisco, CA (US); Ariel Haney, San Francisco, CA (US); Tasos Roumeliotis, Orinda, CA (US)

(73) Assignee: Location Labs, Inc., Emeryville, CA (US)

( * ) Notice: Subject to any disclaimer, the term of this patent is extended or adjusted under 35 U.S.C. 154(b) by 196 days.

(21) Appl. No.: 14/174,552

(22) Filed: Feb. 6, 2014

(65) Prior Publication Data
US 2014/0310403 A1    Oct. 16, 2014

Related U.S. Application Data

(60) Provisional application No. 61/790,739, filed on Mar. 15, 2013.

(51) Int. Cl.
*G06F 15/173* (2006.01)
*H04L 12/24* (2006.01)

(52) U.S. Cl.
CPC .............................. *H04L 41/0813* (2013.01)

(58) Field of Classification Search
CPC ........................... H04M 11/00; G06F 1/3209
See application file for complete search history.

(56) References Cited

U.S. PATENT DOCUMENTS 3,778,809 A    12/1973 Hawes
4,956,825 A    9/1990 Wilts et al.
(Continued)

FOREIGN PATENT DOCUMENTS

EP    1770969    4/2007
FR    2863439 A1    6/2005
WO    WO 2011137279    11/2011

OTHER PUBLICATIONS

U.S. Appl. No. 14/291,983, filed May 30, 2014.
(Continued)

*Primary Examiner* — Hamza N Algibhah
*Assistant Examiner* — Tesfu N Mekonen
(74) *Attorney, Agent, or Firm* — Dovas Law, P.C.

(57) ABSTRACT

A system and method for controlling device use is provided. A computing system stores a first state corresponding to a status of one or more functional components of a user device. A user device stores a second state corresponding to the first state and corresponding to the status of the one or more functional components of the user device. An instruction to modify the status of the one or more functional components of the user device is received, and the computing system modifies the first state and the status of the one or more functional components at a network level responsive to the instruction. The user device modifies the second state and the status of the one or more functional components at a device level responsive to the instruction.

33 Claims, 9 Drawing Sheets

(56) References Cited

U.S. PATENT DOCUMENTS

| | | | |
|---|---|---|---|
| 5,434,562 A | 7/1995 | Reardon | |
| 5,673,691 A | 10/1997 | Abrams et al. | |
| 5,882,258 A | 3/1999 | Kelly et al. | |
| 5,907,831 A | 5/1999 | Lotvin | |
| 5,973,683 A | 10/1999 | Cragun et al. | |
| 6,011,973 A | 1/2000 | Valentine et al. | |
| 6,023,692 A | 2/2000 | Nichols | |
| 6,161,008 A | 12/2000 | Lee et al. | |
| 6,529,724 B1 | 3/2003 | Khazaka et al. | |
| 6,690,940 B1 | 2/2004 | Brown et al. | |
| 6,731,746 B1 | 5/2004 | Usami | |
| 6,782,266 B2 | 8/2004 | Baer et al. | |
| 7,106,843 B1 | 9/2006 | Gainsboro et al. | |
| 7,178,720 B1 | 2/2007 | Strubbe et al. | |
| 7,181,229 B2 | 2/2007 | Singh et al. | |
| 7,257,367 B2 | 8/2007 | Etuk et al. | |
| 7,272,633 B2 | 9/2007 | Malik et al. | |
| 7,313,383 B2 | 12/2007 | Fuji | |
| 7,705,726 B2 | 4/2010 | Graves et al. | |
| 7,729,945 B1 | 6/2010 | Katz et al. | |
| 7,839,891 B1 | 11/2010 | Allan | |
| 7,869,792 B1 | 1/2011 | Zhou et al. | |
| 7,876,704 B1 | 1/2011 | Bins et al. | |
| 7,899,438 B2 | 3/2011 | Baker et al. | |
| 7,925,690 B2 | 4/2011 | Smith et al. | |
| 8,010,037 B2 | 8/2011 | Bannwolf | |
| 8,024,290 B2 | 9/2011 | Yang et al. | |
| 8,095,175 B2 | 1/2012 | Todd et al. | |
| 8,095,413 B1 | 1/2012 | Beaven | |
| 8,107,432 B2 | 1/2012 | Seo | |
| 8,121,879 B1 | 2/2012 | Cohen | |
| 8,135,392 B2 | 3/2012 | Marcellino et al. | |
| 8,160,560 B2 | 4/2012 | Geyer et al. | |
| 8,175,642 B2 | 5/2012 | Shah | |
| 8,185,953 B2 | 5/2012 | Rothstein et al. | |
| 8,193,982 B2 * | 6/2012 | Kupfer | G01S 19/48 342/357.74 |
| 8,255,413 B2 | 7/2012 | De et al. | |
| 8,249,627 B2 | 8/2012 | Olincy et al. | |
| 8,270,933 B2 | 9/2012 | Riemer et al. | |
| 8,280,438 B2 | 10/2012 | Barbera | |
| 8,281,366 B1 | 10/2012 | McCorkendale et al. | |
| 8,315,597 B2 | 11/2012 | Olincy et al. | |
| 8,351,408 B2 | 1/2013 | Daigle | |
| 8,369,838 B2 | 2/2013 | Mallavarapu et al. | |
| 8,384,555 B2 | 2/2013 | Rosen | |
| 8,401,521 B2 * | 3/2013 | Bennett | H04L 63/30 455/141 |
| 8,412,154 B1 | 4/2013 | Leemet et al. | |
| 8,417,268 B1 | 4/2013 | Halferty et al. | |
| 8,503,994 B1 | 8/2013 | Sanjeev | |
| 8,527,013 B2 | 9/2013 | Guba et al. | |
| 8,594,065 B2 | 11/2013 | Polito et al. | |
| 8,620,354 B2 | 12/2013 | Beasley | |
| 8,621,075 B2 | 12/2013 | Luna | |
| 8,635,708 B2 | 1/2014 | Mahan | |
| 8,731,530 B1 | 5/2014 | Breed et al. | |
| 8,738,688 B2 * | 5/2014 | Myers | H04L 67/34 709/203 |
| 8,761,821 B2 | 6/2014 | Tibbitts et al. | |
| 8,768,286 B2 | 7/2014 | Naboulsi | |
| 8,825,035 B2 | 9/2014 | Moton | |
| 8,849,095 B2 | 9/2014 | Hoofien | |
| 8,971,927 B2 | 3/2015 | Zhou et al. | |
| 8,982,781 B2 * | 3/2015 | Starr | G06F 9/44505 370/328 |
| 9,019,068 B2 | 4/2015 | Varoglu | |
| 9,042,872 B1 | 5/2015 | Breed et al. | |
| 9,092,969 B2 | 7/2015 | McCown et al. | |
| 9,124,703 B2 * | 9/2015 | Tadayon | H04B 5/0062 |
| 2001/0023198 A1 | 9/2001 | Muto | |
| 2001/0029196 A1 | 10/2001 | Wakamatsu | |
| 2002/0012894 A1 | 1/2002 | Becker | |
| 2002/0016189 A1 | 2/2002 | Sheynblat et al. | |
| 2002/0147037 A1 | 10/2002 | Kwon | |
| 2002/0174180 A1 | 11/2002 | Brown et al. | |
| 2002/0177475 A1 | 11/2002 | Park | |
| 2002/0178046 A1 | 11/2002 | Lawrence | |
| 2003/0005306 A1 | 1/2003 | Hunt et al. | |
| 2003/0082508 A1 | 5/2003 | Barney | |
| 2003/0158609 A1 | 8/2003 | Chiu | |
| 2003/0211889 A1 | 11/2003 | Walker et al. | |
| 2003/0216138 A1 | 11/2003 | Higuchi et al. | |
| 2004/0024569 A1 | 2/2004 | Camillo | |
| 2004/0030599 A1 | 2/2004 | Sie | |
| 2004/0039624 A1 | 2/2004 | Ikezawa et al. | |
| 2004/0083472 A1 | 4/2004 | Rao et al. | |
| 2004/0166878 A1 | 8/2004 | Erskine et al. | |
| 2004/0203895 A1 | 10/2004 | Balasurlya | |
| 2004/0219493 A1 | 11/2004 | Phillips | |
| 2004/0267607 A1 | 12/2004 | Maddux | |
| 2005/0003895 A1 | 1/2005 | Nara | |
| 2005/0096009 A1 | 5/2005 | Ackley | |
| 2005/0096030 A1 | 5/2005 | Boyd | |
| 2005/0287502 A1 | 12/2005 | Southard et al. | |
| 2006/0085419 A1 | 4/2006 | Rosen | |
| 2006/0085547 A1 | 4/2006 | Cormier | |
| 2006/0184792 A1 | 8/2006 | Berlin | |
| 2006/0270476 A1 | 11/2006 | Denkewiez | |
| 2006/0276180 A1 | 12/2006 | Henry | |
| 2007/0039624 A1 | 2/2007 | Roberts et al. | |
| 2007/0041545 A1 | 2/2007 | Gainsboro | |
| 2007/0203872 A1 | 8/2007 | Flinn et al. | |
| 2007/0208802 A1 | 9/2007 | Barman et al. | |
| 2007/0243852 A1 | 10/2007 | Gibbs | |
| 2007/0263843 A1 | 11/2007 | Foxenland | |
| 2008/0146211 A1 | 6/2008 | Mikan et al. | |
| 2008/0176585 A1 | 7/2008 | Eidering | |
| 2008/0199199 A1 | 8/2008 | Kato et al. | |
| 2008/0201441 A1 | 8/2008 | Bodic et al. | |
| 2008/0201469 A1 | 8/2008 | Reasor et al. | |
| 2008/0246605 A1 | 10/2008 | Pfeffer et al. | |
| 2008/0294586 A1 | 11/2008 | Lim | |
| 2008/0299954 A1 | 12/2008 | Wright et al. | |
| 2008/0307243 A1 | 12/2008 | Lee | |
| 2009/0002147 A1 | 1/2009 | Bloebaum et al. | |
| 2009/0017750 A1 | 1/2009 | Marcinkiewicz | |
| 2009/0038005 A1 | 2/2009 | Howarth | |
| 2009/0055938 A1 | 2/2009 | Samuel | |
| 2009/0064316 A1 | 3/2009 | Liao et al. | |
| 2009/0089876 A1 | 4/2009 | Finamore et al. | |
| 2009/0098914 A1 | 4/2009 | Martin-Cocher et al. | |
| 2009/0181356 A1 | 7/2009 | Dasgupta | |
| 2009/0203352 A1 | 8/2009 | Fordon et al. | |
| 2009/0204471 A1 | 8/2009 | Eienbaas et al. | |
| 2009/0247124 A1 | 10/2009 | de Atley et al. | |
| 2009/0248436 A1 | 10/2009 | Takagi et al. | |
| 2009/0251282 A1 | 10/2009 | Fitzgerald et al. | |
| 2009/0271247 A1 | 10/2009 | Karelin et al. | |
| 2009/0286218 A1 | 11/2009 | Johnson et al. | |
| 2009/0298019 A1 | 12/2009 | Rogan et al. | |
| 2009/0325566 A1 | 12/2009 | Bell et al. | |
| 2010/0028844 A1 | 2/2010 | Wiseman | |
| 2010/0037088 A1 | 2/2010 | Krivopaltsev et al. | |
| 2010/0058446 A1 | 3/2010 | Thwaites | |
| 2010/0076274 A1 | 3/2010 | Severson | |
| 2010/0100398 A1 | 4/2010 | Auker et al. | |
| 2010/0100618 A1 | 4/2010 | Kuhlke et al. | |
| 2010/0106573 A1 | 4/2010 | Gallagher et al. | |
| 2010/0113013 A1 | 5/2010 | Karabinis et al. | |
| 2010/0116884 A1 | 5/2010 | Alderucci | |
| 2010/0125028 A1 | 5/2010 | Heppert | |
| 2010/0145976 A1 | 6/2010 | Higgins et al. | |
| 2010/0154024 A1 | 6/2010 | Boxmeyer et al. | |
| 2010/0210254 A1 | 8/2010 | Kelly et al. | |
| 2010/0211887 A1 | 8/2010 | Woolcombe | |
| 2010/0235223 A1 | 9/2010 | Lyman | |
| 2010/0250352 A1 | 9/2010 | Moore | |
| 2010/0268768 A1 | 10/2010 | Kurtenbach et al. | |
| 2010/0279626 A1 | 11/2010 | Bradley et al. | |
| 2010/0285871 A1 | 11/2010 | Shah | |
| 2010/0317420 A1 | 12/2010 | Hoffberg | |
| 2010/0330543 A1 | 12/2010 | Black et al. | |
| 2010/0330972 A1 | 12/2010 | Angiolilo | |

(56) References Cited

U.S. PATENT DOCUMENTS

| | | |
|---|---|---|
| 2010/0332233 A1 | 12/2010 | Chen et al. |
| 2011/0029598 A1 | 2/2011 | Arnold et al. |
| 2011/0045868 A1 | 2/2011 | Sheha et al. |
| 2011/0047078 A1 | 2/2011 | Ginter et al. |
| 2011/0053523 A1 | 3/2011 | Yeh et al. |
| 2011/0055546 A1 | 3/2011 | Klassen et al. |
| 2011/0070567 A1 | 3/2011 | Linton |
| 2011/0092159 A1 | 4/2011 | Park et al. |
| 2011/0093161 A1 | 4/2011 | Zhou et al. |
| 2011/0117878 A1 | 5/2011 | Barash et al. |
| 2011/0151830 A1 | 6/2011 | Blanda et al. |
| 2011/0231280 A1 | 9/2011 | Farah |
| 2011/0236872 A1 | 9/2011 | Taylor |
| 2011/0244825 A1 | 10/2011 | Ewell, Jr. |
| 2011/0244837 A1 | 10/2011 | Murata et al. |
| 2011/0252375 A1 | 10/2011 | Chaudhri |
| 2011/0275321 A1 | 11/2011 | Zhou et al. |
| 2011/0294520 A1 | 12/2011 | Zhou et al. |
| 2011/0296014 A1 | 12/2011 | Cancel et al. |
| 2011/0302003 A1 | 12/2011 | Shirish et al. |
| 2011/0307434 A1 | 12/2011 | Rostampour et al. |
| 2012/0001548 A1 | 1/2012 | Recker et al. |
| 2012/0008526 A1 | 1/2012 | Borghei |
| 2012/0036220 A1 | 2/2012 | Dare et al. |
| 2012/0058744 A1 | 3/2012 | Felt et al. |
| 2012/0066088 A1 | 3/2012 | Murset |
| 2012/0081500 A1 | 4/2012 | Border et al. |
| 2012/0083287 A1 | 4/2012 | Casto et al. |
| 2012/0084349 A1 | 4/2012 | Lee et al. |
| 2012/0110071 A1 | 5/2012 | Zhou et al. |
| 2012/0131161 A1 | 5/2012 | Ferris et al. |
| 2012/0135705 A1* | 5/2012 | Thaker .................. H04M 3/38 455/405 |
| 2012/0142379 A1 | 6/2012 | Park |
| 2012/0149352 A1 | 6/2012 | Backholm et al. |
| 2012/0151384 A1 | 6/2012 | Stass et al. |
| 2012/0157076 A1 | 6/2012 | Choi |
| 2012/0166285 A1 | 6/2012 | Shapiro et al. |
| 2012/0171990 A1 | 7/2012 | Williams et al. |
| 2012/0172027 A1 | 7/2012 | Partheesh et al. |
| 2012/0172100 A1 | 7/2012 | Colar |
| 2012/0179767 A1 | 7/2012 | Clarke et al. |
| 2012/0188163 A1 | 7/2012 | Xiao |
| 2012/0192016 A1 | 7/2012 | Gotesdyner et al. |
| 2012/0195295 A1 | 8/2012 | Elmaleh |
| 2012/0214472 A1* | 8/2012 | Tadayon .............. H04B 5/0062 455/418 |
| 2012/0215328 A1 | 8/2012 | Schmelzer |
| 2012/0221877 A1 | 8/2012 | Prabu |
| 2012/0223861 A1 | 9/2012 | Kupfer et al. |
| 2012/0226704 A1 | 9/2012 | Boland et al. |
| 2012/0244883 A1 | 9/2012 | Tibbitts et al. |
| 2012/0254949 A1 | 10/2012 | Mikkonen et al. |
| 2012/0258740 A1 | 10/2012 | Mildh et al. |
| 2012/0260118 A1 | 10/2012 | Jiang et al. |
| 2012/0271908 A1 | 10/2012 | Luna et al. |
| 2012/0280916 A1 | 11/2012 | Xia et al. |
| 2012/0315880 A1 | 12/2012 | Peltrow et al. |
| 2012/0323990 A1 | 12/2012 | Hayworth |
| 2012/0330702 A1 | 12/2012 | Kowalski et al. |
| 2013/0040629 A1* | 2/2013 | Sprigg .................. H04W 4/001 455/419 |
| 2013/0047229 A1 | 2/2013 | Hoefel |
| 2013/0054674 A1 | 2/2013 | Myers et al. |
| 2013/0055267 A1 | 2/2013 | Noro |
| 2013/0082878 A1 | 4/2013 | Jarvis et al. |
| 2013/0084847 A1* | 4/2013 | Tibbitts .................. H04W 8/245 455/419 |
| 2013/0091453 A1 | 4/2013 | Kotler et al. |
| 2013/0104246 A1 | 4/2013 | Bear et al. |
| 2013/0111462 A1 | 5/2013 | Umansky et al. |
| 2013/0143512 A1 | 6/2013 | Hernandez et al. |
| 2013/0143521 A1 | 6/2013 | Hernandez et al. |
| 2013/0143528 A1 | 6/2013 | Randazzo et al. |
| 2013/0145007 A1 | 6/2013 | Randazzo et al. |
| 2013/0150004 A1* | 6/2013 | Rosen .................... H04W 8/22 455/414.1 |
| 2013/0185411 A1 | 7/2013 | Martin |
| 2013/0198272 A1 | 8/2013 | Shionoya et al. |
| 2013/0198296 A1 | 8/2013 | Roy et al. |
| 2013/0217331 A1 | 8/2013 | Manente |
| 2013/0217363 A1 | 8/2013 | Myers |
| 2013/0225151 A1* | 8/2013 | King .................. H04M 1/72577 455/419 |
| 2013/0303106 A1 | 11/2013 | Martin |
| 2013/0305384 A1 | 11/2013 | Weiss |
| 2013/0316746 A1 | 11/2013 | Miller et al. |
| 2013/0332886 A1 | 12/2013 | Cranfill et al. |
| 2013/0339345 A1 | 12/2013 | Soto et al. |
| 2013/0346333 A1 | 12/2013 | Hassler et al. |
| 2014/0082065 A1 | 3/2014 | Anakata |
| 2014/0108649 A1 | 4/2014 | Barton et al. |
| 2014/0148192 A1 | 5/2014 | Hodges |
| 2014/0180438 A1 | 6/2014 | Hodges et al. |
| 2014/0310327 A1 | 10/2014 | Yip |
| 2014/0310365 A1 | 10/2014 | Sample et al. |
| 2014/0338006 A1 | 11/2014 | Grkov et al. |
| 2015/0040246 A1 | 2/2015 | Yuen |
| 2015/0079965 A1* | 3/2015 | Mullins .................. H04W 12/08 455/419 |
| 2015/0163664 A1 | 6/2015 | Martin |
| 2015/0188777 A1 | 7/2015 | Frost |
| 2015/0227752 A1 | 8/2015 | Anakata |
| 2017/0135045 A1 | 5/2017 | Hodges et al. |
| 2017/0245111 A1 | 8/2017 | Hodges et al. |
| 2019/0028585 A1 | 1/2019 | Weiss et al. |

OTHER PUBLICATIONS

U.S. Appl. No. 13/723,119, filed Dec. 20, 2012.
Kohavi, "Emerging Trends in Business Analytics", Communications of the ACM, Aug. 2002, vol. 45, No. 8, pp. 45-48.
U.S. Appl. No. 15/412,439, filed Jan. 23, 2017.

* cited by examiner

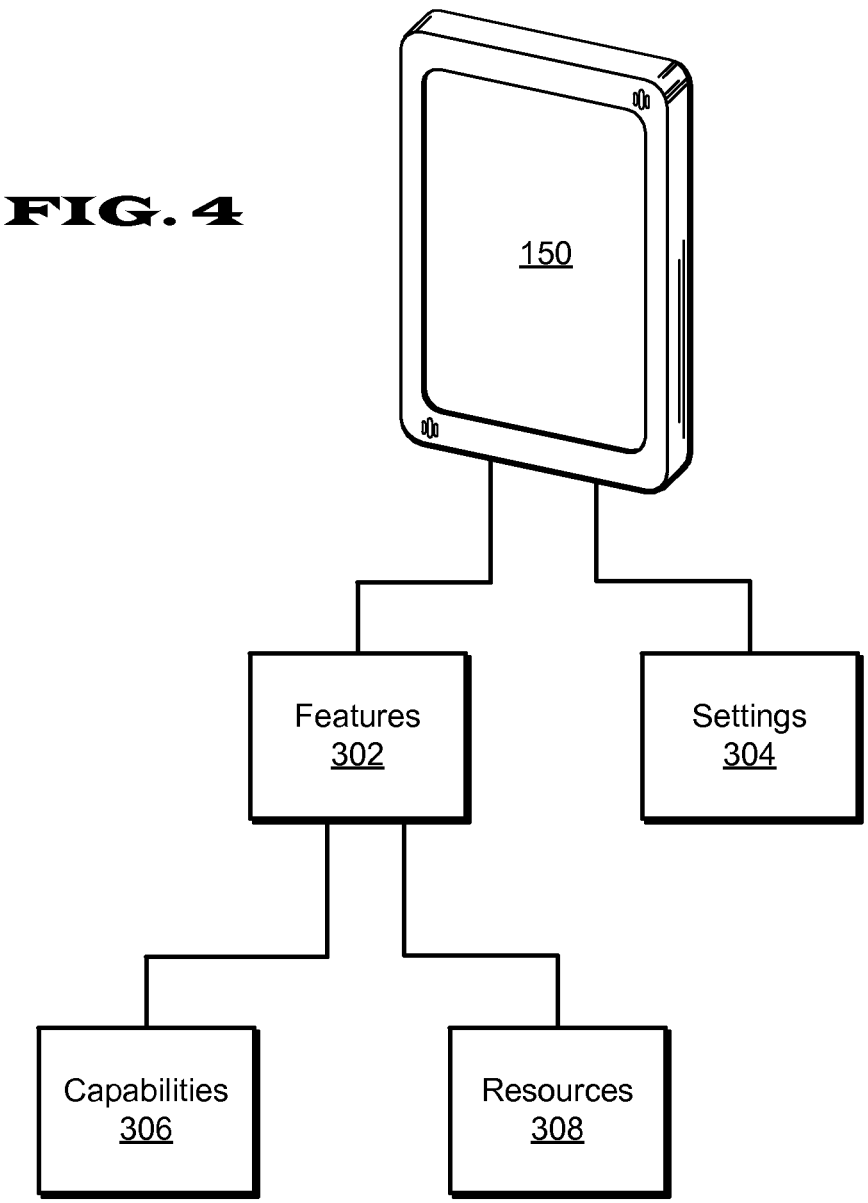

SYSTEM AND METHOD FOR ENABLING USER DEVICE CONTROL

CROSS REFERENCE TO RELATED APPLICATION(S)

This application claims the benefit of U.S. provisional application No. 61/790,739, filed Mar. 15, 2013.

BACKGROUND

With the advent of smartphones, laptops, tablets and other portable electronic devices, computers and digital communication are increasingly intertwined with our social and vocational lives. There is a desire and need to monitor and control the use and operation of such electronic devices.

A child may now have un-tethered access to the Internet, various communication protocols (e.g. phone, video phone, email, text chatting, and text messaging) and a wide variety of digital entertainment. However, devices enabling such access may serve as a distraction which prevents a child from behaving responsibly. Parents are keen to keep an eye on their children's behavior including communication, travel and what media and information their children are exposed to. Further, parents may want to limit the amount of time their children spend exploring and consuming various electronic media and communicating with friends.

As parents want to monitor and control their child's device use, so too do employers want to monitor and control their employees' device use. Employee time is a valuable resource which may be wasted when an employee uses their portable electronic device for non-business purposes. Similarly, a teacher may want to monitor and control their students' device use during school hours to avoid distractions to the learning process. Further, any user with supervisory responsibility over another user may desire to monitor or limit a person's use of a particular communication device. That said, control of a device which is possessed by the user whose use is to be monitored or controlled is not a trivial matter and can be hindered by a number of factors.

The functions performed by mobile communication devices such as smart phones are increasingly complex and it is becoming more difficult to monitor the operation of such as device even when the person or entity attempting to monitor a particular device is in possession of the device. A mobile communication device may execute applications which unknown to the device user aggregate or disseminate personal information of the device user. Such applications may for example be enabled by a manufacturer of the device, a telecommunication carrier providing phone and network services to the device, the device user, or a computer virus. In any event, it would be desirable to allow a person or entity the ability to monitor and control the operation their own electronic device or the electronic device of another.

SUMMARY

A method for controlling device use is provided. The method includes storing by a computing system a first state corresponding to a status of one or more functional components of a particular user device, the computing system configured for operation within a network. The method further includes storing by the particular user device a second state corresponding to the first state and corresponding to the status of the one or more functional components of the particular user device. An instruction to modify the status of the one or more functional components of the user device is received, and the computing system modifies the first state and the status of the one or more functional components at a network level responsive to the instruction. The user device modifies the second state and the status of the one or more functional components at a device level responsive to the instruction.

In another method for controlling device use, a computing system stores a first state corresponding to a status of one or more functional components of a particular user device at a network level, the computing system configured for operation within a network. The particular user device stores a second state corresponding to the first state and corresponding to the status of the one or more functional components of a particular user device at a device level, wherein a particular application executable on the particular user device is configured to enable storing and modifying of the second state and modifying the status of the one or more functional components at a device level. An instruction to modify the status of the one or more functional components of the particular user device is received, and the computing system determines at least one of a disabling of the particular application, a tampering with the second state, and a failure to communicate with the particular user device. The computing system modifies the first state and the status of the one or more functional components at a network level responsive to the instruction and responsive to determining the at least one of a disabling of the particular application, a tampering with the second state, and a failure to communicate with the particular user device.

In another method for controlling device use, a computing system stores a first state corresponding to a status of one or more functional components of a particular user device at a network level, the computing system configured for operation within a network. The particular user device stores a second state corresponding to the first state and corresponding to the status of the one or more functional components of a particular user device at a device level, wherein a particular application executable on the particular user device enables storing and modifying of the second state and modifying the status of the one or more functional components at a device level. The computing system determines at least one of a disabling of the particular application, a tampering with the second state, and a failure to communicate with the particular user device. The computing system modifies the first state and the status of the one or more functional components at a network level responsive to determining the at least one of a disabling of the particular application, a tampering with the second state, and a failure to communicate with the particular user device.

In a method for monitoring a user device, an instruction is received to determine a status of the user device with respect to a particular functional component of the user device. It is determined based on communication via a network when a particular user device is available, and the user device is monitored at a device level with respect to the particular functional component when the user device is available. It is determined when a particular network which supports communication of the user device is available, and the user device is monitored at a network level with respect to the particular functional component when the particular network is available. One or more processors determine the status of the user device with respect to the particular functional component based on the monitoring at the network level and/or the monitoring at the device level, and the determined status is reported.

BRIEF DESCRIPTION OF THE DRAWING(S)

The foregoing Summary as well as the following detailed description will be readily understood in conjunction with the appended drawings which illustrate embodiments of the invention. In the drawings:

FIG. 4 is a diagram depicting example functional components supported by a particular user device implementing the device manager of FIG. 1.

DETAILED DESCRIPTION OF ILLUSTRATIVE EMBODIMENT(S)

Embodiments are described below with reference to drawing FIGS. 1-8. Like numerals represent like elements throughout. In addition, the terms "a" and "an" as used herein do not denote a limitation of quantity, but rather denote the presence of at least one of the referenced items.

Described herein are systems enabling the integration of a monitoring and control mechanism including components residing in multiple network locations for the purpose of controlling function of a user device for example a smartphone, laptop computer or other wired or wireless terminal which can be configured to operate on a wired or wireless telecommunication network. Described herein is the integration of controls on both a user device and on a telecommunication carrier network-enabled system providing a robust and flexible way to monitor and control user device function with numerous advantages over known device controls.

Figure 1:
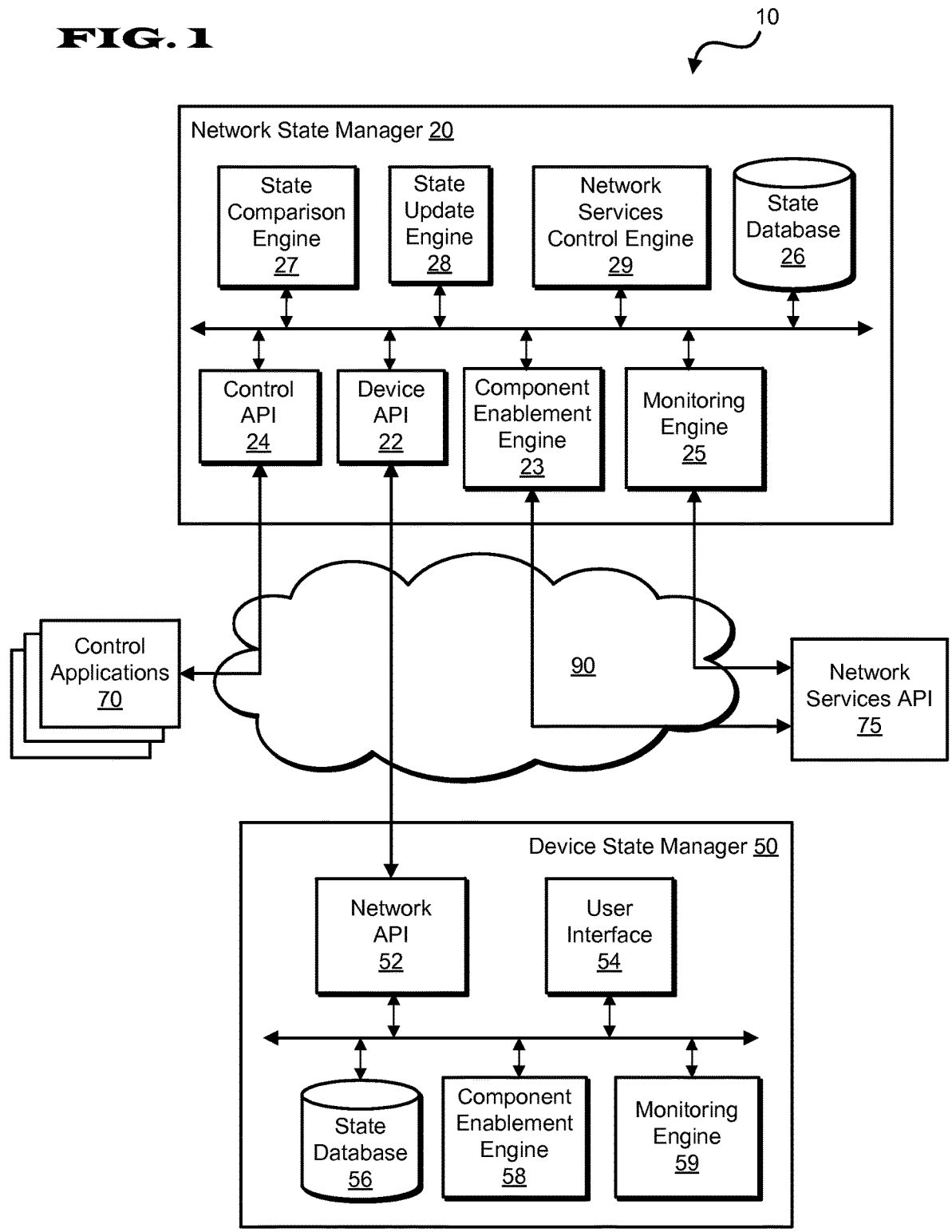
FIG. 1 shows an operating environment including a network manager and a device manager.

Referring to FIG. 1, a schematic illustration is shown of an exemplary operating environment 10 in which a network state manager 20 (hereinafter "network manager 20") functions in a communications network 90, preferably including one or more wired or wireless networks or a combination thereof. The network manager 20 and its constituent elements are preferably implemented on one or more network connectable processor-enabled computing systems via hardware components, software components sharing one or more processing units, or a combination thereof. The network manager 20 need not be implemented on a single system at a single location, but can be decentralized for example in a peer-to-peer configuration. The network manager 20 has a device state manager application program interface 22 (hereinafter "device manager API 22"), a control API 24, a component enablement engine 23, a monitoring engine 25, a state database 26, a state comparison engine 27, a state update engine 28, and a network services control engine 29. The device manager API 22 interfaces with a device state manager 50 (hereinafter "device manager 50") via a network state manager application program interface 52 (hereinafter "network manager API 52") in a synchronous or asynchronous manner. The control API 24 is configured to interface with one or more control applications 70 which enable a user or application to provide instructions for monitoring and controlling the state of functional components of a particular device.

The component enablement engine 23 is configured to interface with a network services API 75, for example enabled by a telecommunication carrier for monitoring and controlling user device use at a network level. The monitoring engine 25 is configured to interface with the network services API 75 for monitoring user device use at a network level. Alternatively, the network manager 20 can be implemented by a telecommunication carrier and can be enabled to monitor and control a user device (e.g., a cellular communication device) on the telecommunication carrier network for example via a network services control engine 29. In any case, enabling or disabling control of a given user device 150 via a telecommunication carrier network is performed by sending a signal to a system operated by a telecommunication carrier. This signal can be sent via an internet protocol or other communication protocol. Monitoring can be performed by querying data from a system operated by a telecommunication carrier.

The device manager 50 can be implemented via encoded instructions on a user device, which user device preferably functions as a wireless transmitting and receiving device with cellular telephone functionality, and which instructions can be hardware or software enabled. Alternatively the device manager 50 can be implemented on a computing system remote to the user device and provide instructions to the user device for performing necessary functions of the device manager 50.

The control application 70 can reside on the user device on which the device manager 50 is implemented. Alternatively, the control application 70 can reside on a separate computer system in communication with the network manager 20 via the communications network 90. The control application 70 can include a web browser and enable a user to control states corresponding to a particular user device on which the device manager 50 is executed. For example a parent may provide instructions to the network manager 20 to monitor or control the state of particular functional components on a user device via the device manager 50. The control application 70 can alternatively include a third party application configured to autonomously or semi-autonomously provide the network manager instructions for monitoring and controlling the particular user device. Further, the device manager 50 when executed on a particular user device enables a user interface 54 permitting an authorized user to control functional components of the particular user device from the particular user device. The device manager 50 includes a functional component enablement engine 58 which is configured to enable and disable functional components of a user device implementing the device manager 50. A monitoring engine 59 is provided to monitor functional components including device use. Functional components of a user device preferably include software or hardware driven features, settings, capabilities and resources. Different user devices may correspond to different functional components. Monitoring via the monitoring engine 59 can include for example monitoring use by a device user of particular functional components and monitoring of data generated by particular functional components of the user device.

The network manager 20 includes a network state database 26 which stores states which indicate statuses of functional components of each user device implementing a device manager 50. The statuses of the functional components of the user device can comprise an indication of whether a particular functional component is enabled or disabled or an indication of one or more scheduled time periods when a particular functional component is enabled or disabled. The statuses of the functional components can further include a particular set of modifiable parameters. The device manager 50 includes a device state database 56 which stores states. States can be received from the network manager 20. For the purpose of clarity, states corresponding to a particular user device and stored by the network manager 20 are herein termed "network states", and network states received from the network manager 20 or otherwise generated and stored by the device manager 50 are herein termed "device states".

The network manager 20 is configured to receive from a control application 70 via the control API 24 a request to modify the status of one or more functional components of a particular user device implementing the device manager 50. A request to modify a functional component status can come in the form of a preference indication, for example "turn on user device location streaming" or "turn off user device location streaming". A request can further include modification of one or more parameters of a functional component. The network manager 20 uses the state update engine 28 to update one or more network states respectively corresponding to the one or more of the functional components responsive to the instruction from the control application 70 to modify the status of the functional components. Further, a particular functional component can be related to other functional components, wherein a request to modify the status of a particular functional component triggers the update of the state corresponding to the particular functional component and one or more states corresponding to one or more related functional components.

In response to network state updates, updated states are transmitted from the network manager 20 to a user device, or other system implementing the device manager 50, via the network manager API 52. The network manager 20 is configured to transmit updated states to the user device in for example using internet protocol (e.g., sockets, secure sockets, TCP/IP or HTTP/HTTPS).

The device manager 50 uses the functional component enablement engine 58 to enable or disable a functional component as indicated by the received corresponding network state. The received network state is stored by the device manager 50 as the corresponding device state in the device state database 56, preferably overwriting the existing corresponding device state.

Figure 2:
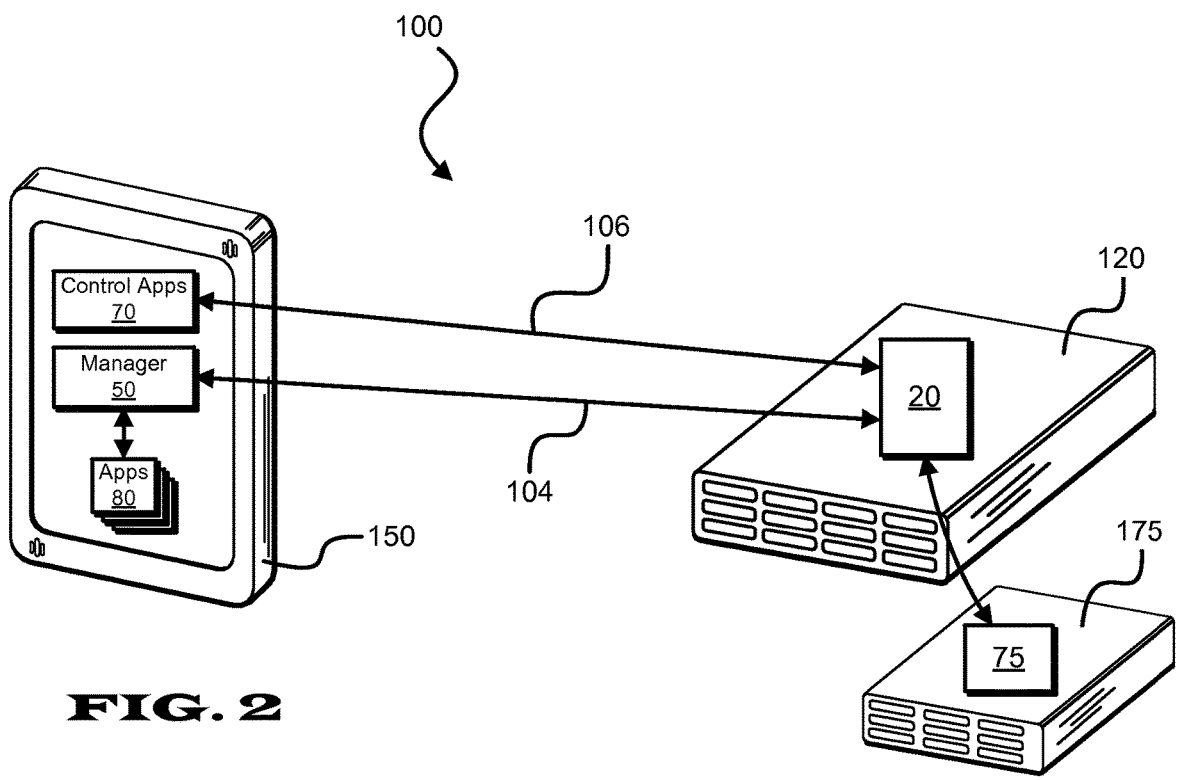
FIGS. 2 and 3 are diagrams depicting example implementations of the device manager and the network manager of FIG. 1.

Referring to FIG. 2, an example implementation 100 of the system of FIG. 1 is shown in which the control application 70 resides on a user device 150 on which the device manager 50 is implemented. The network manager 20 is implemented on a state server 120. Synchronous communications 104, 106, for example implementing HTTPS through a data network, are initiated between the device manager 50 and the network manager 20 and between the control application 70 and the network manager 20, respectively. The network manager 20 is configured to interface with a network services API 75 on a telecommunication carrier server 175, to enable or disable functional components of the user device 150 at a network level.

Figure 3:
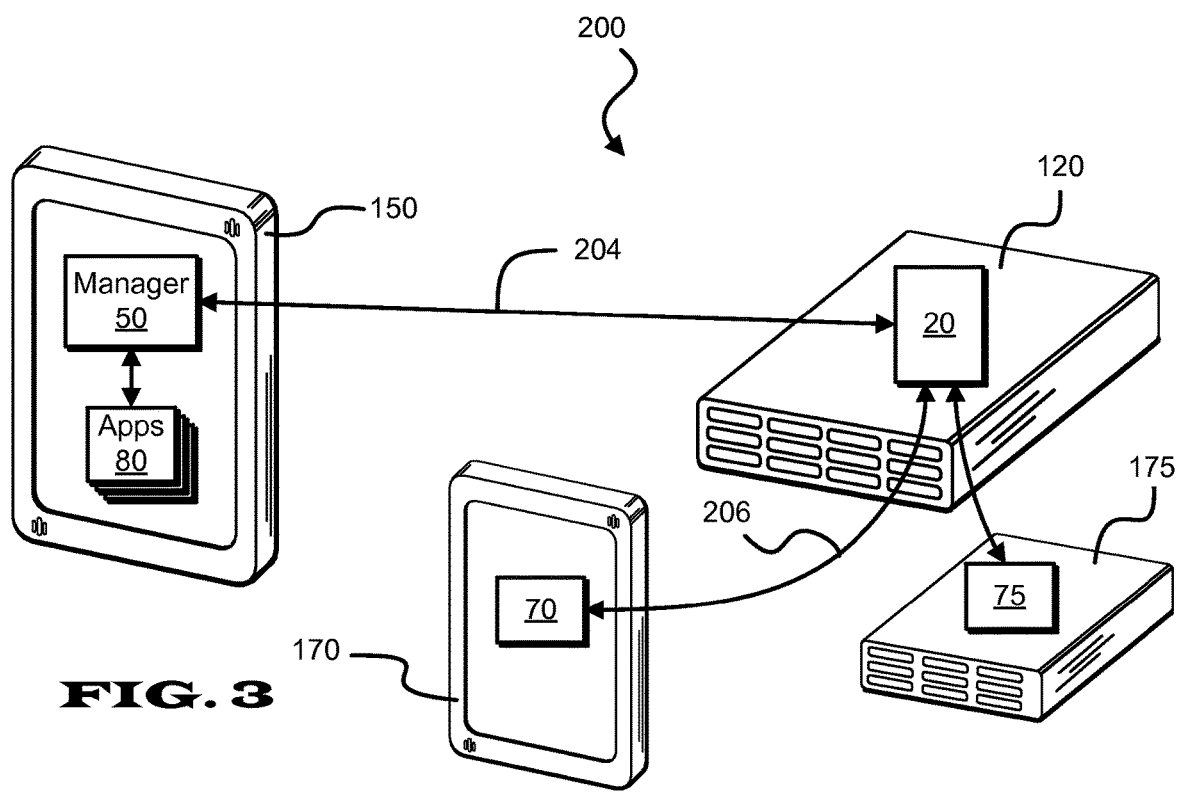

Referring to FIG. 3, in another example system implementation 200 the control application 70 alternatively resides away from the user device 150 on a separate computer system such as a computing device 170 in communication with the network manager 20, for example via a data network. The computing device 170 can include for example a personal computer, laptop computer, or smart phone allowing a user to monitor and control the network state via web-based control application 70. The computing device 170 can alternatively include a third party application server hosting a third party control application 70. Synchronous communications 204, 206 are initiated between the device manager 50 and the network manager 20 and between the control application 70 and the network manager 20, respectively. The network manager 20 is configured to interface with a network services API 75 on a telecommunication carrier server 175, to enable or disable functional components of the user device 150 at a network level.

As indicated above, functional components can include a user device's software or hardware driven features, settings, capabilities and resources. Tables 1-4 below respectively show example features, capabilities, settings and resources, with associated component numbers, which can be enabled and disabled by the functional component enablement engine 58 of the device manager 50 on a particular user device. Depending on network and device configuration, select ones of these example features, capabilities, settings and resources can also be enabled and disabled at a network level by the network state manager 20. Alternatively other suitable functional components can be enabled and disabled by the device manager 50 and network state manager 20. Table 5 below shows example parameters which can be set for particular features and capabilities via application request or user request.

TABLE 1

| No. | Feature |
|---|---|
| F1 | Location data access |
| F2 | Short message service ("SMS") access |
| F3 | Multimedia messaging service ("MMS") access |
| F4 | Voice call access |
| F5 | Global positioning system ("GPS") access/control |
| F6 | Applications control |
| F7 | Contact access |
| F8 | Device interface locking control |
| F9 | Communication with device user |

TABLE 2

| No. | Setting |
|---|---|
| S1 | Networking retry time interval |
| S2 | Networking maximum number of retries |
| S3 | GPS timeout time |
| S4 | GPS maximum acceptable precision |
| S5 | Device interface locking triggering driving speed |
| S6 | Device interface locking triggering minimum travel distance |
| S7 | User device heartbeat time interval |
| S8 | Network location timeout time |

TABLE 3

| No. | Capability | Parent Feature |
|---|---|---|
| C1 | Location Streaming | F1 (Location data access) |
| C2 | On demand location requesting | F1 |
| C3 | Gathering incoming SMS activity | F2 (SMS access) |

TABLE 3-continued

| No. | Capability | Parent Feature |
|---|---|---|
| C4 | Gathering outgoing SMS activity | F2 |
| C5 | Gathering incoming MMS activity | F3 (MMS access) |
| C6 | Gathering outgoing MMS activity | F3 |
| C7 | Gathering incoming voice call activity | F4 (Voice call access) |
| C8 | Gathering outgoing voice call activity | F4 |
| C9 | Detection of whether GPS is on or off | F5 (GPS access/control) |
| C10 | Forcing GPS on if off | F5 |
| C11 | Reporting of installed applications on client | F6 (Applications control) |
| C12 | Reporting of contacts | F7 (Contact access) |
| C13 | Locking interface based on time schedule | F8 (Device interface locking control) |
| C14 | Locking interface based on driving | F8 |
| C15 | Screen Messaging | F9 (Communication with device user) |

TABLE 4

| No. | Resource | Parent Feature |
|---|---|---|
| R1 | Main text for lock screen | F8 |
| R2 | Message text for lock screen | F8 |
| R3 | Auto reply text for lock screen | F8 |
| R4 | Override text for lock screen | F8 |
| R5 | Emergency text for lock screen | F8 |
| R6 | Background image for lock screen | F8 |
| R7 | Branding image for lock screen | F8 |
| R8 | Message regarding subscriber privacy | F9 |

TABLE 5

| No. | Parameter | Parent Feature/ Capability |
|---|---|---|
| P1 | Which mobile applications can run or be launched while interface is locked (e.g. a music playing application) | F8, C13, and C14 |
| P2 | Which phone numbers can interface-locked device continue to place calls to or receive calls from | F8, C13, and C14 |
| P3 | Which phone numbers can interface-locked device continue to receive messages (e.g. SMS) from | F8, C13, and C14 |
| P4 | Whether a hands free device connected to the interface-locked device (e.g. Bluetooth headset) can be used to place phone calls | F8, C13, and C14 |
| P5 | Whether an auto reply message is sent to a user/device sending a message (e.g. SMS) to the interface-locked device | F8, C13, and C14 |
| P6 | Message content | C15 |
| P7 | URL link associated with message | C15 |
| P8 | Whether to launch device web browser and connect to URL responsive to interaction with message | C15 |

Some functional components can be related to the extent that modification of the status of a particular functional component may result in modification in the status of one or more related functional components. Referring to FIG. 4 and Tables 1-4, a particular user device 150, can be enabled for example with features 302, settings 304, capabilities 306 and resources 308. Particular features 302 are related to particular capabilities 306 and particular resources 308, wherein modification of the status of a particular capability 306 or particular resource may result in modification of the status of a particular feature 302 or vice versa. User device user-specific data ("subscriber-specific data"), for example user device location data, is disseminated by a user device based on status of the capabilities 306, which data is stored in a subscriber database 36 in the network manager 20 for dissemination to an authorized control application 70.

Figure 5A:
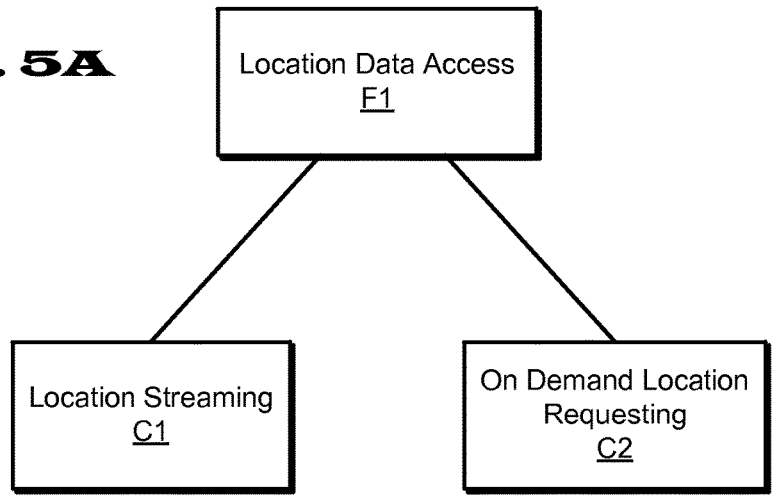
FIGS. 5A and 5B are diagrams depicting relationships between example functional components supported by a particular user device implementing the device manager of FIG. 1.

Referring to FIG. 5A, capabilities C1 (location streaming) and C2 (on demand location requesting), are related to feature F1 (location data access), wherein a change in status of feature F1 can result in a change in status of capability C1 or C2, or alternatively a change in status of capability C1 or C2 results in a change in status of feature F1. For example, a request from a control application 70 to enable or disable feature F1, immediately or during a scheduled time period, causes the network manager 20 to update the network states and any corresponding digests of those states of feature F1 and capabilities C1 and C2 to reflect that features F1 and capabilities C1 and C2 are enabled or disabled. In another example a request from a control application 70 to the network manager 20 via the control API 24 to disable location streaming capability C1 causes the state update engine 28 to update the network state of capability C1. The request further causes the network manager 20 to update the network state and corresponding digest of the location data access feature F1.

Figure 5B:
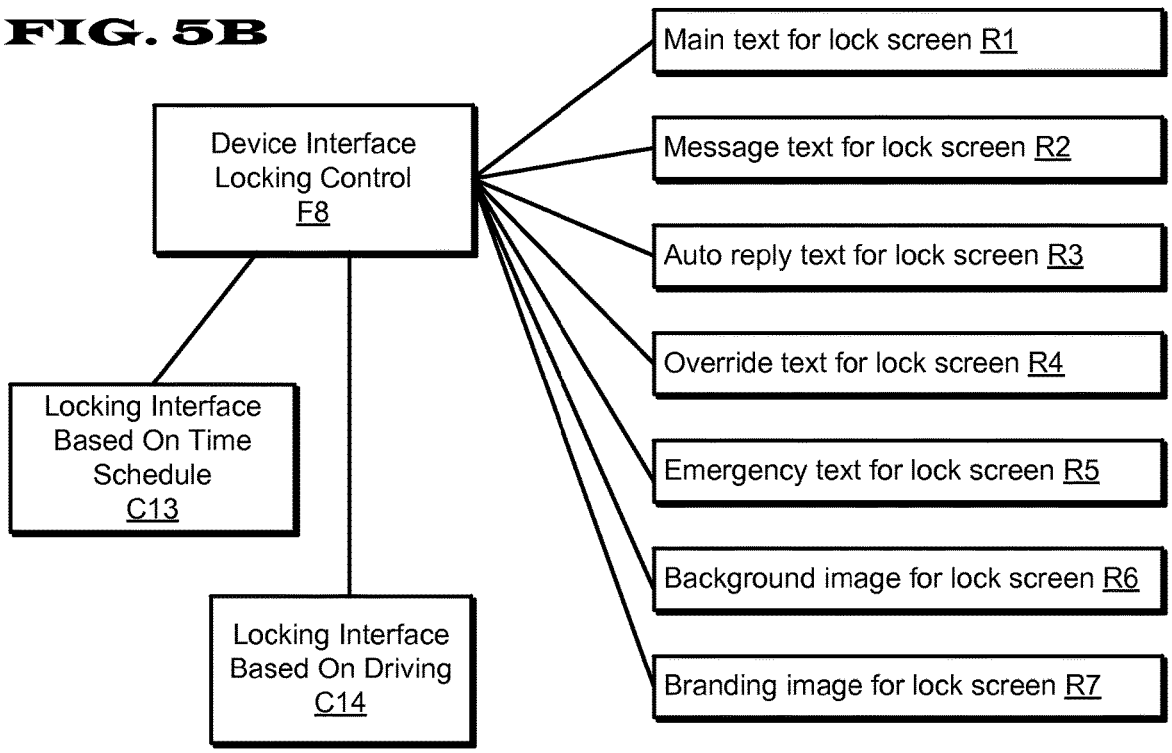

Referring to FIG. 5B, capabilities C13 (Locking interface based on time schedule) and C14 (Locking interface based on driving), and resources R1-R7 are related to feature F8 (Device interface locking control), wherein a change in status of feature F8 can result in a change in status of capability C13 or C14, or alternatively a change in status of capability C13 or C14 results in a change in status of feature F8. For example, a request from a control application 70 to enable or disable the device interface locking control feature F8, immediately or during a scheduled time period, causes the network manager 20 to update the network states of feature F8 and capabilities C13 and C14 to reflect that feature F8 and capabilities C13 and C14 are enabled or disabled. In another example a request from a control application 70 to the network manager 20 via the control API 24 to lock the user device interface during a particular time period via capability C13 causes the state update engine 28 to update the network state of capability C13. The request further causes the network manager 20 to update the network state of the device interface locking control feature F8.

In view of the above examples, capabilities C1 and C2 comprise a capability group which enables feature F1, and capabilities C13 and C14 and resources R1-R7 enable features F8. Referring to Table 3 capabilities C3 and C4 comprise a capability group which enables feature F2, capabilities C5 and C6 comprise a capability group which enables feature F3, capabilities C7 and C8 comprise a capability group which enables feature F4, capabilities C9 and C10 comprise a capability group which enables feature F5, capability C11 enables feature F6, capability C12 enables feature F7, capabilities C13 and C14 and resources R1-R7 enable feature F8, capability C15 and resource R8 enable feature F9.

Figure 5C:
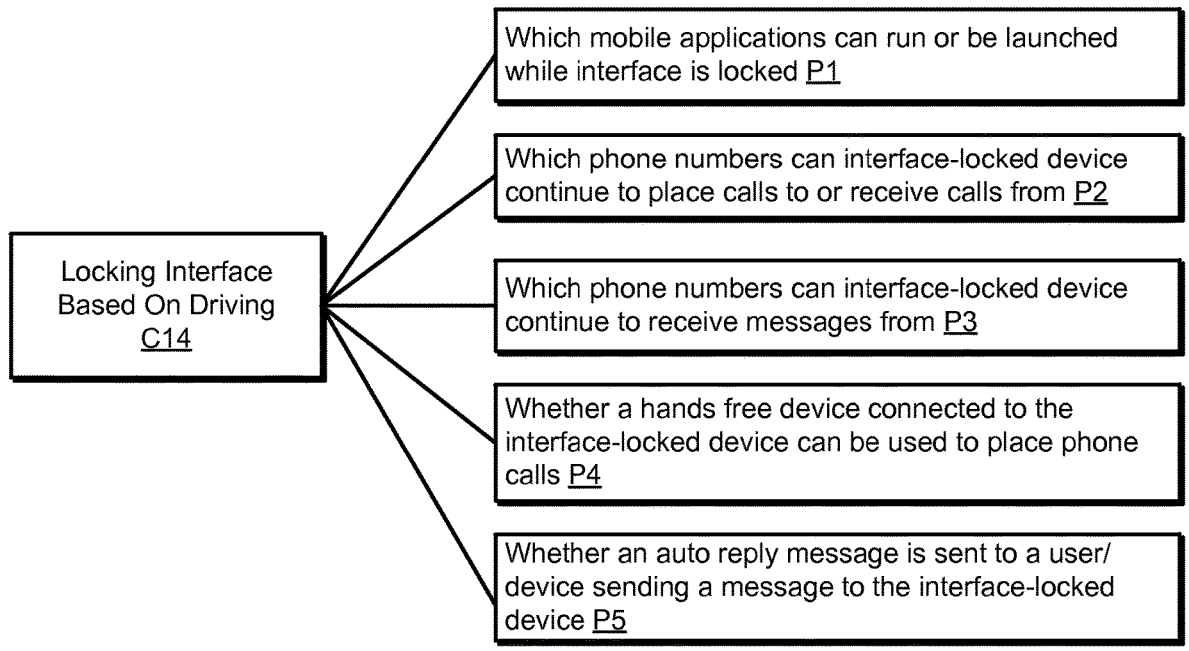
FIGS. 5C and 5D are diagrams depicting relationships between example functional components and related parameters supported by a particular user device implementing the device manager of FIG. 1.
Figure 5D:
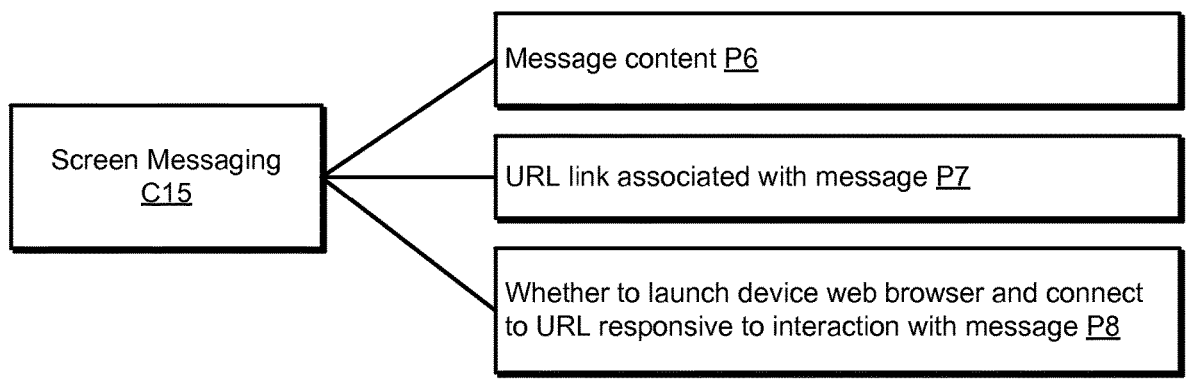

Referring to Table 5 and FIGS. 5C and 5D, particular enabled features and capabilities allow setting of parameters by a control application 70, for example by user input or via autonomous action by the application. For example as shown in FIG. 5C, a control application 70 enabling the locking interface based on driving capability C14 can set: 1) parameter P1 to select applications which can run when device interface is locked, 2) parameter P2 to select phone numbers which interface-locked device can continue to place calls to or receive calls from, 3) parameter P3 to select phone numbers from which the interface-locked device can continue to receive messages (e.g. SMS) from, 4) parameter P4 to select whether a hands free device connected to the interface-locked device (e.g. Bluetooth headset) can be used to place phone calls, and 5) parameter P5 to select whether an auto reply message is sent to a user/device sending a message (e.g. SMS) to the interface-locked device. As shown in Table 5, parameters P1 through P5 are also applicable to capability C13, locking interface based on time schedule, and feature F8, device interface locking control. As shown in FIG. 5D, a control application 70 enabling the screen messaging capability C15 can set: 1) parameter P6 to specify message content, 2) parameter P7 to specify a URL link associated with a specified message, and 3) parameter P8 to select whether to launch a device web browser and connect to a specified URL responsive to user interaction with a specified message (e.g. user clicking on message).

Figure 6:
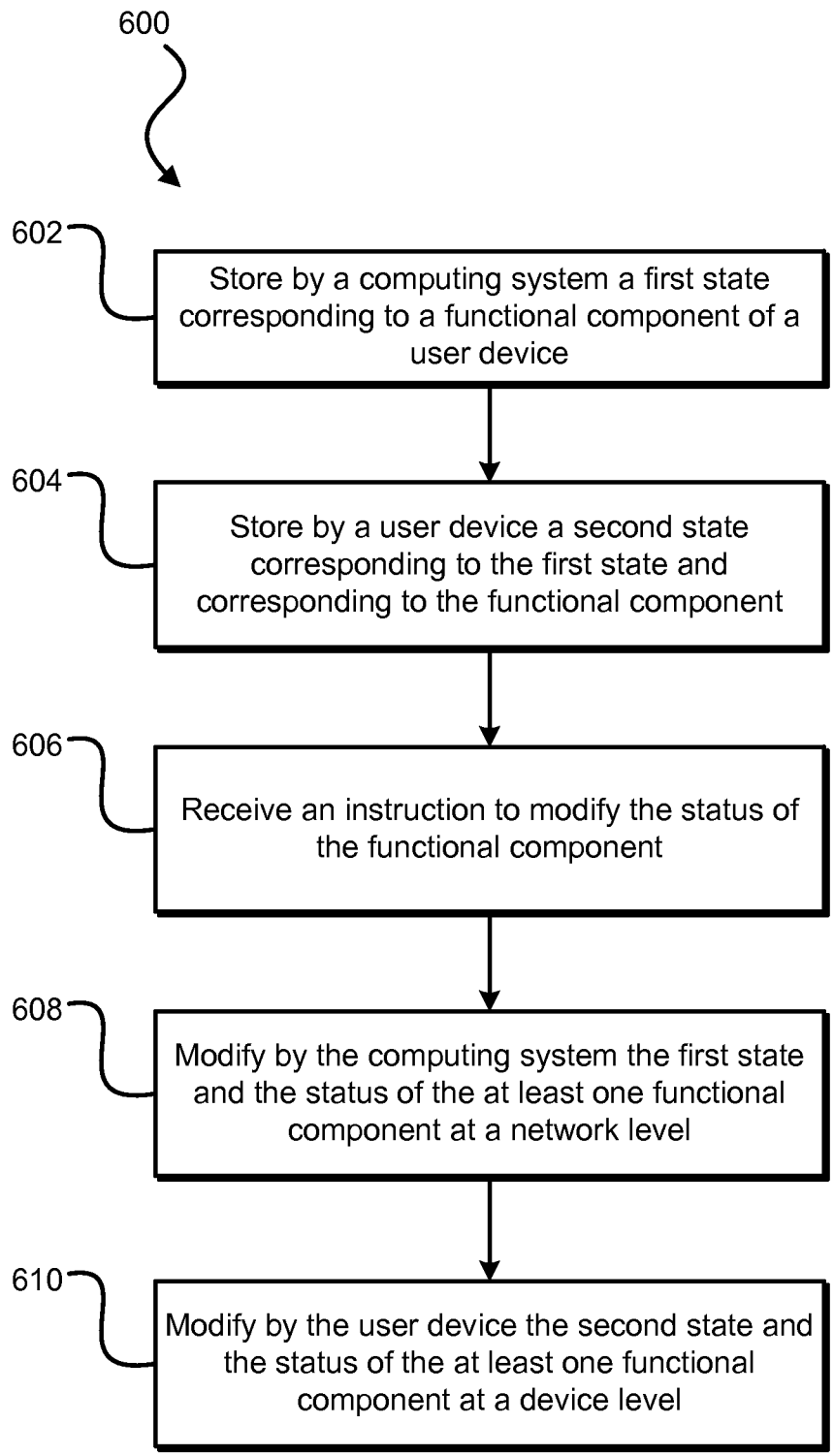
FIGS. 6-8 are flow charts depicting methods for controlling device use for example via a network manager and device manager.

Referring to FIG. 6, a method 600 for controlling device use is shown. The method 600 is described with reference to the components shown in the systems described in FIGS. 1, 2 and 3 which are preferably configured for performing the method 600 and include or have access to suitable non-transitory data storage including instructions for performing the method 600. The method 600 may alternatively be performed via other suitable systems and devices. The method 600 is not limited to the components shown in FIGS. 1, 2 and 3 which are merely exemplary.

In a step 602, a computing system stores a first state corresponding to a status of one or more functional components of a particular user device, the computing system configured for operation within a network. In a step 604, the particular user device stores a second state corresponding to the first state and corresponding to the status of the one or more functional components of a particular user device. An instruction to modify the status of one or more functional components of the user device is received (step 606). Responsive to the instruction, the status of the one or more functional components at a network level is modified by the computing system, and the status of the first state is modified by the computing system (step 608). Further responsive to the instruction, the status of the one or more functional components at a device level is modified by the user device, and the second state is modified by the user device (step 610). The computing system can correspond for example to the network manager 20 as implemented on the server 120. The user device can correspond for example to the device manager 50 as implemented on the user device 150. Hereinafter the computing system of the method 600 is referred to as the network manager 20 and the user device of the method 600 is referred to as the device manager 50. Further hereinafter, the first state is referred to as the network state and the second state is referred to as the device state.

If the user device 150 implementing the device manager 50 is turned off, or otherwise unavailable, a network state stored by the network manager 20 can enable the execution of controls corresponding to the device state when the user device 150 is turned on or otherwise becomes available. In such case, the instruction is received by the network manager 20. Responsive to the instruction at a first time the status of the one or more functional components is modified by the network manager 20 at the network level, and the network state is modified by the network manager 20. An indication of the network state can be transmitted to the device manager 50 at a second time after the first time when the device manager 50 becomes available via the network. Based on the indication of the network state, the status of the one or more functional components is modified by the device manager 50 at the device level, and the device state is modified by the device manager 50.

Modifying the status of a functional component at the device level includes triggering an action by an application on the user device 150 to control the functional component. Such application can include a user level application 80, as illustrated in FIGS. 2 and 3, enabled to control one or more features, settings, capabilities or resources on a user device 150. Alternatively, modifying the status of a functional component at the device level includes triggering an action by hardware on the user device 150, the hardware enabled to control one or more features, settings, capabilities or resources on the user device 150.

If the network manager 20 is not available, for example due to an unavailable carrier network, a device state stored by the device manager 50 can enable the execution of controls corresponding to the network state when the network manager 50 becomes available. In such case, the instruction is received by the device manager 50 for example from a user via a user interface of the user device 150 or via an alternate network, such as a WiFi™ network. Responsive to the instruction, the status of the one or more functional components is modified by the device manager 50 at the device level, and the device state is modified by the device manager 50. Later, an indication of the device state is transmitted by the device manager 50 to the network manager 20 when the network manager 20 becomes available via the network. Based on the indication of the device state, the status of the one or more functional components is modified by the network manager 20 at the network level, and the network state is modified by the network manager 20. Having two sources of control for functional components, at a network level and at a device level, offers a degree of system redundancy with respect to a single point of failure.

It should be noted that as a practical matter the network manager 20 or carrier network is typically less likely to be unavailable than the device manager 50 or user device 150. Further, if unavailable, the network manager 20 or carrier network is likely to be unavailable for a shorter period of time than the device manager 50 or user device 150 would be unavailable.

Over time a plurality of instructions to modify the status of the one or more functional components of the user device can be received. Statuses of the one or more functional components can be modified by the network manager 20 at a network level for example by modifying one or more network states, and statuses of the one or more functional components can be modified by the device manager at a device level for example by modifying one or more device states. Historical data corresponding to the instructions is stored by the network manager 20 and by the device manager 50, wherein the historical data is accessible on the network manager 20 when the device manager 50 is inaccessible, for example when the user device 150 is turned off, and the historical data is accessible on the device manager 50 when the network manager 20 is inaccessible, for example when a servicing carrier network is inoperable. This redundancy allows control operations or analytics to be performed when one of either the carrier network or user device 150 is unavailable.

Provisioning or activating control infrastructure for a particular device 150 or user of the device 150 on a network via the network manager 50 may not require action on the part of a user of the device 150. Different protocols can be employed for activating controls on the network via the network manager 20 and on the device via the device manager 50. For example a first consent can be obtained following a first protocol and the status of the one or more functional components can be modified by the network manager 20 at the network level responsive to the first consent. A second consent can be obtained following a second protocol, and the status of the one or more functional components can be modified by the device manager 50 at the device level responsive to the second consent.

For a device 150 where for example software can be installed to enable the device manager 50 on the device 150, a particular device control corresponding to a functional component can be enabled or disabled in a variety of ways. A device control can be manually enabled or disabled directly on the device 150, wherein instructions to enable or disable the control is received by the device 150 via a user interface of the device 150. Alternatively, a control can be enabled or disabled through an instruction signal sent through a telecommunication carrier network, WiFi network, or other network to the device 150, for example by a carrier based protocol, internet protocol, or other communication protocol.

Modifying the status of the one or more functional components in step 608 and 610 of the method 600 can include enabling or disabling the one or more functional components of the user device 150. Enabling and disabling a functional component can correspond to allowing and disallowing the initiating and receiving of communications, such as phone calls, text messages or other communication, on the user device 150. The control of such communications can be performed via application software on the user device 150, for example via application software enabling the device manager 50 and corresponding component enablement engine 58 for controlling functional components at a device level. The control of such communications can be performed at a network level, for example in a telecommunication carrier network via a network services API 75, by signaling the network manager 20 to disallow the initiating or receiving of communications to or from the user device 150. In such case, phone calls, text messages and other communications to and from the user device 150 can be blocked for example at the telecommunication carrier network.

Modifying the status of the one or more functional components in step 608 and 610 of the method 600 can alternatively include controlling communication between a user of the user device and a particular contact, blocking communications such as phone calls and text messages to or from a particular phone number, particular device, or particular contact. Blocking communications can be performed via application software on the user device 150, for example via application software enabling the device manager 50 and corresponding component enablement engine 58, to disallow initiating or receiving phone calls or other communications from a particular phone number, device, or contact. The control of such communications can be performed at a network level, for example in a telecommunication carrier network via a network services API 75 by signaling the network manager 20 to disallow the initiating or receiving of communications between the user device 150 and a particular phone number, device, or contact. In such case, phone calls, text messages, and other communications between user device 150 and a particular phone number, particular device, or particular contact can be blocked for example by a processing element in the telecommunication carrier network. The particular phone number, device, or contact can be determined based for example on data garnered from a contact list stored on the user device 150, based on network usage of a user of the user device 150, or based on a query to a network accessible server executing a social networking application.

Modifying the status of the one or more functional components can further include applying a filter corresponding to the user device, the filter configured to allow particular network content and disallow other particular network content to the user device. For example, the filter can be applied to filter what internet content is available to be downloaded, viewed, executed, or purchased using a particular user device. The filter can take the form of disallowing certain content or only allowing certain content. The filter for internet content can be enabled via application software on the user device 150, when the user device 150 is available, for example via application software enabling the device manager 50 and corresponding component enablement engine 58 which can employ the filter. Alternatively, the filter can be enabled at a network level, for example by a processing element in a telecommunication carrier network via a network services API 75, wherein a request by the user device 150 for network content are first run through the telecommunication internet carrier filter, and if the request does not pass through the filter successfully, the requested content is denied.

In a case where the user device 150 is configured to access a plurality of networks (e.g., a carrier network and a WiFi network), modifying the status of the one or more functional component can include disabling access to a particular one of the plurality of networks.

Control of use of a user device 150 can further include limiting data usage of the user device 150, limiting phone call time of the user device, and a enforcing one or more telecommunication carrier policies on the user device 150, which controls can be enabled for example via a request from a control application 70 to the network manager 20 via the control API 24. Further, the status of one or more functional components of a user device 150 can be modified at particular times based on a particular schedule. Such controls can be implemented at a device level or network level.

Having device level controls enabled by the device manager 50 on a user device 150 can offer advantages over network controls with respect to what functional components are controllable the degree of control. With the device manager 50, activity on the user device 150 can be more directly monitored, the user device 150 can be more directly controlled, and location can typically be determined more accurately. Some controls, such as constraining usage of non-network-connected game applications executed on the user device 150, cannot be controlled at the network level.

It thus may be desirable to deincentivize the device based controls from being uninstalled from the user device 150. This can involve coordination between the network manager 20 and the device manager 50. If the network manager 20 detects that a particular application enabling the device manager 50 has been uninstalled, the network manager 20 can act to constrain device usage at a network level, for example, only allowing phone calls to specific phone numbers, such as phone numbers corresponding to parents of the user of the device 150 or emergency phone numbers, such as 911. The network manager 50 can determine one or more of disabling of the particular application, a tampering with the device state, and a failure to communicate with the particular user device. Then the network manager 50 can disable one or more functional components of the user device 150 based on such determination.

Having both network controls and device controls helps eliminate the opportunity for a device user to tamper with a controlled state of a particular user device 150. If a user attempts to disable, by removing or deactivating, software on the user device 150 that implements controls, then control of the user device can revert to the carrier network. When both the carrier network and device 150 are available, the execution of a control can be performed at both the network level and on the user device 150 at substantially the same time to achieve minimal latency of the control.

Figure 7:
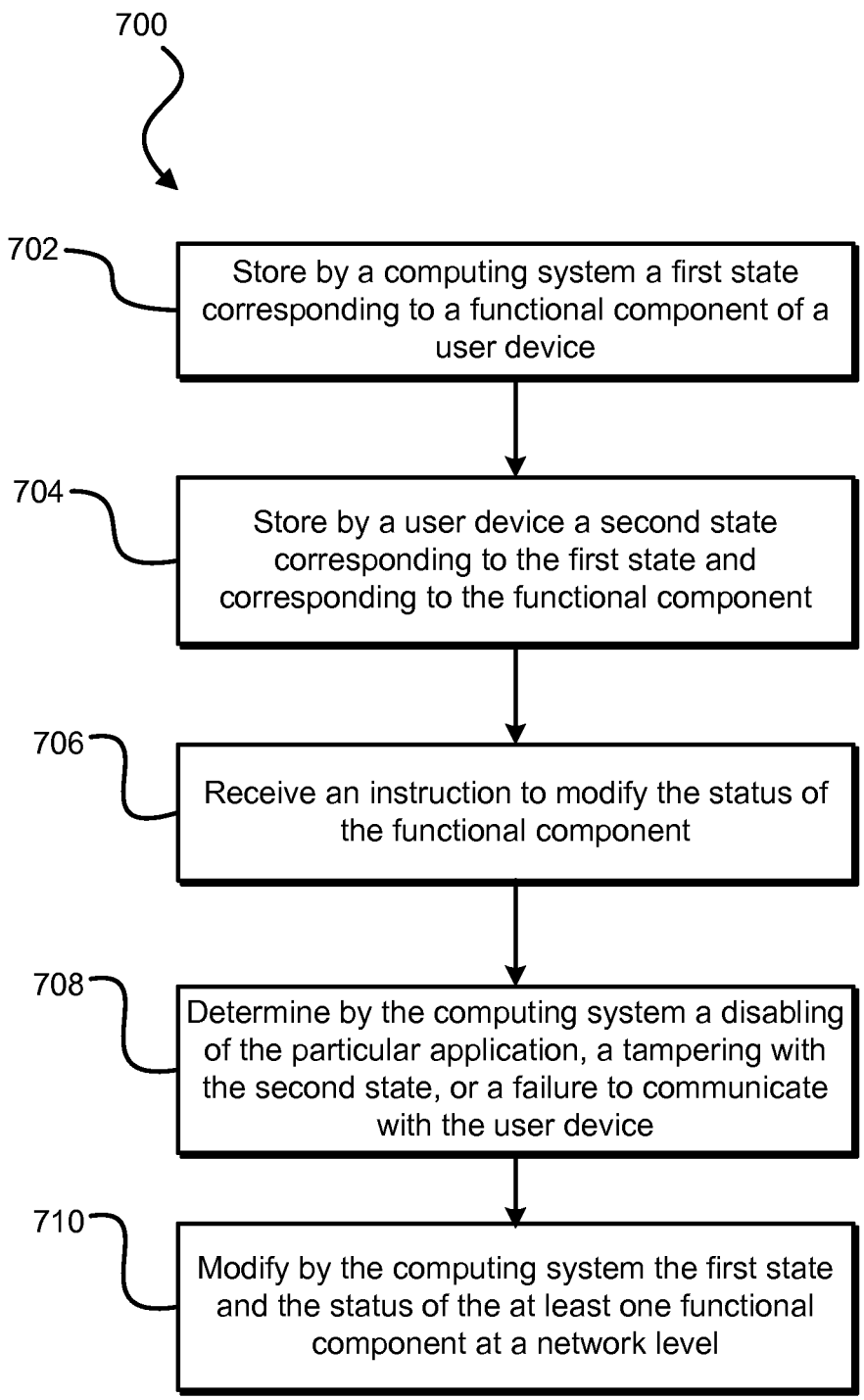

Referring to FIG. 7, a method 700 for controlling device use is shown. The method 700 is described with reference to the components shown in the systems described in FIGS. 1, 2, and 3 which are preferably configured for performing the method 700 and include or have access to suitable non-transitory data storage including instructions for performing the method 700. The method 700 may alternatively be performed via other suitable systems and devices. The method 700 is not limited to the components shown in FIGS. 1, 2, and 3 which are merely exemplary.

In a step 702, a computing system (e.g., network manager 20) stores a first state (e.g., network state) corresponding to a status of one or more functional components of a particular user device (e.g., user device 150) at a network level, the computing system configured for operation within a network. In a step 704, the particular user device stores (e.g, via the device manager 50) a second state (e.g., device state) corresponding to the first state and corresponding to the status of the one or more functional component of the particular user device at a device level, wherein a particular application executable on the particular user device is configured to enable storing and modifying of the second state and modifying the status of the one or more functional components at a device level. In a step 706, an instruction is received by the computing system to modify the status of the one or more functional components of the particular user device. In a step 708, the computing system determines at least one of a disabling of the particular application, a tampering with the second state, and a failure to communicate with the particular user device. In a step 710, responsive to determining the at least one of a disabling of the particular application, a tampering with the second state, and a failure to communicate with the particular user device, the status of the one or more functional components at a network level is modified by the computing system, and the status of the first state is modified by the computing system (step 608).

Figure 8:
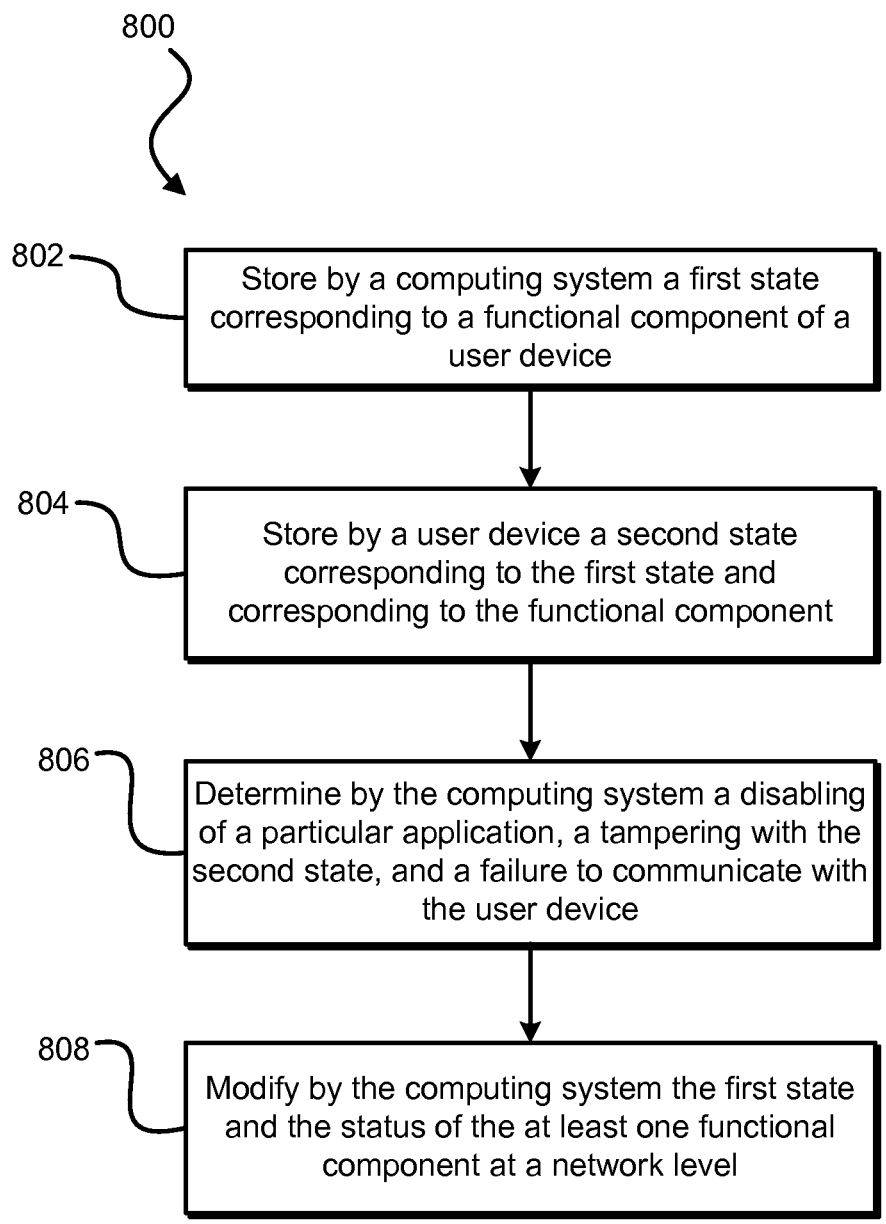

Referring to FIG. 8, a method 800 for controlling device use is shown. The method 800 is described with reference to the components shown in the systems described in FIGS. 1, 2, and 3 which are preferably configured for performing the method 800 and include or have access to suitable non-transitory data storage including instructions for performing the method 800. The method 800 can alternatively be performed via other suitable systems and devices. The method 800 is not limited to the components shown in FIGS. 1, 2, and 3 which are merely exemplary.

In a step 802, a computing system (e.g., network manager 20) stores a first state (e.g., network state) corresponding to a status of one or more functional components of a particular user device (e.g., user device 150) at a network level, the computing system configured for operation within a network. In a step 804, the particular user device stores (e.g., via the device manager 50) a second state (e.g., device state) corresponding to the first state and corresponding to the status of the one or more functional components of the particular user device at a device level, wherein a particular application executable on the particular user device enables storing and modifying of the second state and modifying the status of the one or more functional components at a device level. In a step 806, the computing system determines at least one of a disabling of the particular application, a tampering with the second state, and a failure to communicate with the particular user device. In a step 808, responsive to determining the at least one of a disabling of the particular application, a tampering with the second state, and a failure to communicate with the particular user device, the status of the one or more functional components at a network level is modified by the computing system, and the status of the first state is modified by the computing system. The modification of the status of the one or more functional components in the methods 700 and 800 can be can be performed in the manners described above with reference to the systems depicted in FIGS. 1-4 and 5A-5D and the method 600 of FIG. 6.

Figure 9:
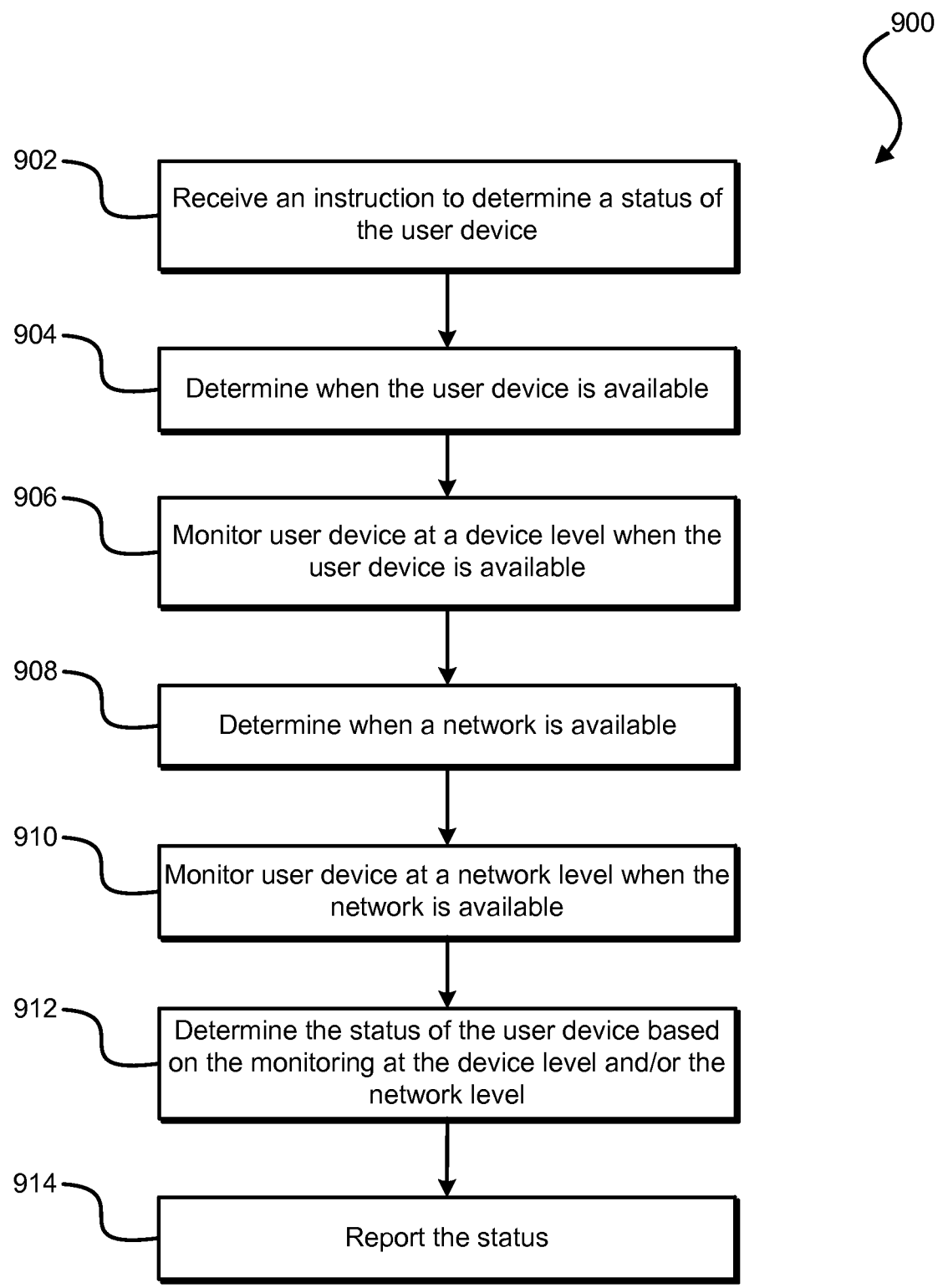
FIG. 9 is a flowchart depicting a method for monitoring device use.

Referring to FIG. 9, a method 900 for monitoring device use is shown. The method 900 is described with reference to the components shown in the systems described in FIGS. 1, 2, and 3 which are preferably configured for performing the method 900 and include or have access to suitable non-transitory data storage including instructions for performing the method 900. The method 900 can alternatively be performed via other suitable systems and devices. The method 900 is not limited to the components shown in FIGS. 1, 2, and 3 which are merely exemplary.

The method 900 includes receiving an instruction to determine a status of the user device (e.g., user device 150) with respect to a particular functional component of the user device (step 902). The instruction can be received by the control API 24 of the network manager 20 from a control application 70. It is determined based on communication via a network when a particular user device is available (step 904). The network manager 20 can for example determine if a particular user device is available by determining if the network API 52 of the device manager 50 operating on the particular user device is available. When the user device is available, the user device is monitored at a device level with respect to the particular functional component (step 906), for example by the monitoring engine 59 of the device manager 50. It is determined when a particular network which supports communication of the user device is available (step 908). For example, the monitoring engine 25 can determine when the telecommunication carrier network on which the user device operates is functional via a query to the network services API 75. When the particular network is available, the user device is monitored at a network level with respect to the particular functional component (step 910), for example by the monitoring engine 25 through contact with the network services API 75. The status of the user device with respect to the particular functional component is determined by at least one processor based on either the monitoring at the network level or the monitoring at the device level, or both the monitoring at the network level and the monitoring at the device level (step 912) and the status is reported (step 914). The status can be determined for example by the monitoring engine 25 and reported via the control API 24 of the network manager 20.

Monitoring the user device with respect to a particular functional component can include monitoring applications used, text messages and emails sent and received, phone calls made and received, services operating, contacts added/modified or deleted, calendar events added/modified or deleted, Internet browsing history, cell tower triangulation location data, GPS location data, and accelerometer data. In determining the status of the user device with respect to the functional component, a classifier can be trained to integrate device level monitoring inputs and network level monitoring inputs, for example by the network manager 20 and/or the device manager 50. The trained classifier can be applied to the data obtained from the monitoring at the device level and the data obtained from the monitoring at the network level to determine the status of the user device with respect to the functional component of the user device. The accuracy of the status determination can be increased by using both data obtained from the monitoring at the device level and the data obtained from the monitoring at the network level to make the determination.

The particular functional component of the user device can correspond to a functional component of the mobile device as described above. For example, the particular functional component can correspond to the above-described feature F1, location data access, and the status of the user device with respect to a particular functional component can correspond to a geographic location of the user device or a geographic path of the user device. In such case, monitoring the user device at the device level can include receiving location data and generating location data by a first process (e.g., GPS), and monitoring the user device at the network level can include receiving location data or generating location data by a second process (e.g., cell tower triangulation). In another example, where the particular functional component corresponds to GPS, other location determining system, or an accelerometer, the status of the user device with respect to a particular functional component can correspond to determining whether the user device is located in a moving motor vehicle, for example determining whether the user of the device is driving a car based on sensor data from the user device.

The method for determining a status of a user device with respect to a particular functional component of the user device at a network level can be different from determining the status of the user device at the device level. For example, cell tower triangulation can be used for determining at the network level that a user of a particular user device is driving or in a moving vehicle, whereas device-based GPS can be used for determining at a device level that the user of the particular user device is driving or in a moving vehicle. The accuracy of such a determination can be increased when both network and device detection are active, for example by training a classifier to integrate both inputs, which can be trained against a ground truth. One method of taking both of these inputs is to use linear regression. In such manner the accuracy of monitored states can be increased when both the network and the user device are available.

It should be noted that as a practical matter the network manager 20 or carrier network is less likely to be unavailable than the device manager 50 or user device 150. Further, if unavailable, the network manager 20 or carrier network is likely to be unavailable for a shorter period of time than the device manager 50 or user device 150 would be unavailable.

The integration of network and user device controls as described above can be used in various applications. Parents can use integrated carrier network/device controls for example to manage cell phone usage by their children at specific times during the day (e.g., to control access to particular phone numbers during school hours), to prevent bullies from contacting their children over their cell phone, and to prevent their children from viewing objectionable content using their cell phone. Parents can also enforce control of device use if their child disables (e.g., uninstalls) a control application (e.g., device manager 20) on their child's cell phone. In this event, a network manager (e.g., network manager 50) can detect that the child has disabled the control application, and disable or limit cell phone function in response thereto, for example only allowing calls to the parents, until the control application has been re-enabled on the cell phone. Such controls can be enforced differently based on the time of day or day of the week. For example some controls can be lifted during after school hours and on days when school is not in session.

Businesses can benefit from the integration of network and user device controls as described above to limit use of business handsets to business related functions, to control expenses through tracking of calls, to limit handset personal usage, to prevent employees from using devices to view objectionable content on their handset, to monitor the employee handset, to use business logic to limit personal usage of the handset to certain time periods, and to limit overall aggregate time spent with non-business usage of the employee handset. Such controls can be enforced differently based on the time of day. For example some controls can be lifted during non-work hours and on days when no work is scheduled.

Telecommunication carriers can benefit from the integration of network and user device controls as described above. Carriers can use integrated controls to put explicit limits on handset usage, both in and out of their carrier network. These controls can limit data usage and total call time and enforce carrier policy. Carrier device based controls, on their own or in conjunction with network controls, have the ability to enable monitoring what applications and services are using what channels for network support. Integrated controls can be "eyes and ears" to understand what applications and services are being used, what networks they are carried over (e.g., WiFi, 2.5G/3G/LTE) and what congestion they are seeing locally. In addition, integrated controls can enable/disable access to one particular network or another. Further, integrated controls can gain statistical information and do analytics to help with network planning.

While illustrative embodiments have been described in detail above, the invention is not limited to the specific embodiments described above, which should be considered as merely exemplary. Further modifications and extensions may be developed, and all such modifications are deemed to be within the scope defined by the appended claims.

What is claimed is:

1. A method for controlling device use, the method comprising:
    storing by a network-operable computing system a first state corresponding to a status of at least one functional component of a mobile user device;
    storing by the mobile user device a second state corresponding to the first state and corresponding to the status of the at least one functional component of the mobile user device;
    receiving an instruction to control the at least one functional component of the mobile user device;
    determining via network communication an availability of the mobile user device;
    determining via network communication an availability of a telecommunication carrier system of a carrier network on which the mobile user device operates;
    modifying by the mobile user device the second state and controlling the at least one functional component at a device level responsive to the instruction when the mobile user device is available, wherein the controlling the at least one functional component at the device level comprises disallowing via a particular application installed on the mobile user device at least one of initiating communication or receiving communication by the mobile user device; and
    modifying by the computing system the first state and controlling the at least one functional component at a network level responsive to the instruction and responsive to determining that the mobile user device is unavailable, whereby a switch from the device level control to the network level control is implemented when the mobile user device is unavailable, and wherein the controlling the at least one functional component at the network level comprises signaling the telecommunication carrier system of the carrier network on which the mobile user device operates, wherein communication at least one of to or from the mobile user device is blocked by a processing element within the carrier network.

2. The method of claim 1, further comprising:
receiving the instruction by the computing system;
modifying the first state and controlling the at least one functional component by the computing system at the network level at a first time;
transmitting an indication of the first state to the mobile user device at a second time after the first time when the mobile user device becomes available via network communication; and
modifying by the mobile user device the second state and controlling the at least one functional component at the device level based on the indication of the first state.

3. The method of claim 1, further comprising:
receiving the instruction by the mobile user device;
modifying by the mobile user device the second state and controlling the at least one functional component at the device level at a first time;
transmitting an indication of the second state to the computing system at a second time after the first time when the computing system becomes available via the carrier network; and
controlling the at least one functional component by the computing system at the network level based on the indication of the second state.

4. The method of claim 1, further comprising:
receiving a plurality of indications of requests to modify the status of the at least one functional component of the mobile user device;
modifying by the computing system at least the first state and controlling the at least one functional component at the network level responsive to the plurality of indications of requests;
modifying by the mobile user device at least the second state and controlling the at least one functional component at the device level responsive to the plurality of indications of requests; and
storing by the computing system and by the mobile user device historical data corresponding to the requests, wherein the historical data is accessible on the computing system when the mobile user device is inaccessible and the historical data is accessible on the mobile user device when the computing system is inaccessible.

5. The method of claim 1, further comprising:
obtaining a first consent following a first protocol;
controlling the at least one functional component at the network level responsive to the first consent;
obtaining a second consent following a second protocol; and
controlling the at least one functional component at the device level responsive to the second consent.

6. The method of claim 1, wherein the controlling the at least one functional component at the network level and the controlling the at least one functional component at the device level comprise controlling communication between a user of the mobile user device and a particular contact.

7. The method of claim 6, wherein the controlling the at least one functional component at the network level and the controlling the at least one functional component at the device level comprise blocking communications at least one of to or from a particular phone number.

8. The method of claim 6, further comprising determining the particular contact based on data garnered from at least one of a contact list stored on the mobile user device, network usage, or a network accessible application server enabling a social networking application.

9. The method of claim 1, wherein the controlling the at least one functional component at the device level comprises disabling the at least one functional component.

10. The method of claim 1, wherein the particular application installed on the mobile user device enables storing and modifying of the second state, the method further comprising:
determining via network communication by the computing system at least one of a disabling of the particular application, a tampering with the second state, or a failure to communicate with the mobile user device; and
disabling the at least one functional component by the computing system at the network level based on the determining by the computing system the at least one of the disabling of the particular application, the tampering with the second state, or the failure to communicate with the mobile user device.

11. The method of claim 10, wherein disabling the at least one functional component comprises disabling phone calls from the mobile user device to particular contacts.

12. The method of claim 1, wherein the instruction is received by the mobile user device through network communication.

13. The method of claim 1, wherein the instruction is received by the mobile user device through a network connection via at least one of carrier based protocol, internet protocol, or WiFi protocol.

14. The method of claim 1, wherein the instruction is received by the mobile user device via a user interface of the mobile user device.

15. The method of claim 1, wherein the instruction is received by the computing system through a network communication.

16. The method of claim 1, wherein the controlling the at least one functional component at the device level comprises disallowing the initiating and receiving of communications on the mobile user device.

17. The method of claim 1, wherein the controlling the at least one functional component at the device level comprises disallowing on the mobile user device initiating of communications to and receiving of communications from at least one of a particular device, a particular contact, or a particular telephone number.

18. The method of claim 1, wherein controlling the at least one functional component at the device level comprises applying a filter corresponding to the mobile user device, the filter configured to allow particular network content and disallow other particular network content to the mobile user device.

19. The method of claim 1, further comprising controlling the at least one functional component at least one of at the network level or at the device level at particular times based on a particular schedule.

20. The method of claim 1, wherein the instruction to control the at least one functional component comprises at least one of:
a request to limit data usage of the mobile user device;

a request to limit phone call time of the mobile user device; or a request to enforce one or more telecommunication carrier policies on the mobile user device.

21. The method of claim 1, wherein the mobile user device is configured to access a plurality of networks, and wherein the controlling the at least one functional component at the network level and the controlling the at least one functional component at the device level comprises disabling access to a particular one of the plurality of networks.

22. The method of claim 1, wherein the controlling the at least one functional component at the device level comprises enabling filtering of network content by the mobile user device, and wherein the controlling the at least one functional component at the network level comprises enabling filtering of network content outside the mobile user device by the processing element within the carrier network.

23. The method of claim 1, wherein the controlling the functional component at the device level includes triggering an action by the particular application on the mobile user device.

24. The method of claim 23, wherein the particular application on the mobile user device comprises a user level application.

25. The method of claim 23, wherein the controlling the at least one functional component at the device level comprises controlling the at least one functional component based on at least one of a time of day or a day of the week.

26. A method for controlling device use, the method comprising:

storing by a computing system a first state corresponding to a status of at least one functional component of a particular user device at a network level, the computing system configured for operation within a network;

storing by the particular user device a second state corresponding to the first state and corresponding to the status of the at least one functional component of the particular user device at a device level, wherein a particular application executable on the particular user device is configured to enable storing and modifying of the second state and controlling the at least one functional component at the device level;

receiving an instruction to control the at least one functional component of the particular user device;

modifying by the particular user device the second state and controlling by the particular user device the at least one functional component at the device level responsive to the instruction, wherein the controlling the at least one functional component at the device level comprises disallowing via the particular application at least one of initiating communication or receiving communication by the particular user device;

determining by the computing system at least one of a disabling of the particular application, a tampering with the second state, or a failure to communicate with the particular user device; and modifying by the computing system the first state and controlling by the computing system the at least one functional component at the network level responsive to the instruction and responsive to determining the at least one of the disabling of the particular application, the tampering with the second state, or the failure to communicate with the particular user device, whereby a switch to the network level control from the device level control is implemented when it is determined that the particular application is disabled, the second state is tampered with, or there is the failure to communicate with the particular user device, and wherein the controlling the at least one functional component at the network level comprises signaling a telecommunication carrier system of a carrier network on which the particular user device operates, wherein communication at least one of to or from the particular user device is blocked by a processing element within the carrier network.

27. A method for controlling device use, the method comprising:

storing by a computing system a first state corresponding to a status of at least one functional component of a mobile user device at a network level, the computing system configured for operation within a network;

storing by the mobile user device a second state corresponding to the first state and corresponding to the status of the at least one functional component of the mobile user device at a device level, wherein a particular application executable on the mobile user device enables storing and modifying of the second state and controlling the at least one functional component at the device level;

modifying by the mobile user device the second state and controlling by the mobile user device the at least one functional component at the device level by disallowing via the particular application at least one of initiating communication or receiving communication by the mobile user device;

determining by the computing system at least one of a disabling of the particular application, a tampering with the second state, or a failure to communicate with the mobile user device; and modifying by the computing system the first state and controlling the functional component at the network level responsive to determining the at least one of the disabling of the particular application, the tampering with the second state, or the failure to communicate with the mobile user device, whereby a switch to the network level control from the device level control is implemented when it is determined that the particular application is disabled, the second state is tampered with, or there is the failure to communicate with the mobile user device, and wherein the controlling the at least one functional component at the network level comprises signaling a telecommunication carrier system of a carrier network on which the mobile user device operates, wherein communication at least one of to or from the mobile user device is blocked by a processing element within the carrier network.

28. A computer network comprising a computing system and a user device, the computing system comprising a first processor and first data storage including instructions enabling the first processor to perform a first process comprising:

storing a first state corresponding to a status of at least one functional component of the user device;

receiving an instruction to modify the status of the at least one functional component of the user device;

determining via network communication an availability of the user device;

determining via network communication an availability of a telecommunication carrier system of a carrier network on which the user device operates; and modifying the first state and controlling the at least one functional component at a network level responsive to the instruction to modify the status of the at least one functional component and responsive to determining that the user device is unavailable, wherein a switch from a device level control to the network level control is implemented when the user device is unavailable, and wherein the controlling the at least one functional component at the network level comprises signaling the telecommunication carrier system of the carrier network on which the user device operates, wherein communication at least one of to or from the user device is blocked by a processing element within the carrier network; and the user device comprising a second processor and second data storage including instructions enabling the second processor to perform a second process comprising:

storing a second state corresponding to the first state and corresponding to the status of the at least one functional component of the user device; and modifying the second state and controlling the at least one functional component at the device level responsive to the instruction to modify the status of the at least one functional component when the user device is available, wherein the controlling the at least one functional component at the device level comprises disallowing via an application installed on the user device at least one of initiating communication or receiving communication by the user device.

29. A method for monitoring a user device, the method comprising:

receiving an instruction to determine a status of the user device with respect to a particular functional component of the user device;

determining based on communication via a network when the user device is available;

monitoring at a device level the user device with respect to the particular functional component when the user device is available, wherein monitoring the particular functional component at the device level comprises monitoring via an application installed on the user device at least one of initiated communication or received communication by the user device;

determining when a particular network which supports communication of the user device is available;

monitoring at a network level the user device with respect to the particular functional component when the particular network is available in response to determining the user device is unavailable, whereby a switch from the device level monitoring to the network level monitoring is implemented when the user device is unavailable, and wherein monitoring the at particular functional component at the network level comprises signaling a telecommunication carrier system of a carrier network on which the user device operates, wherein communication at least one of to or from the user device is monitored by a processing element within the carrier network;

determining by at least one processor the status of the user device with respect to the particular functional component based on at least one of the monitoring at the network level or the monitoring at the device level; and reporting the determined status.

30. The method of claim 29, further comprising determining by the at least one processor the status of the user device with respect to the particular functional component based on the monitoring at the network level and the monitoring at the device level.

31. The method of claim 30, further comprising:

training a classifier to integrate device level monitoring inputs and network level monitoring inputs;

receiving data from the monitoring at the device level and data from the monitoring at the network level; and applying the classifier to the data from the monitoring at the device level and the data from the monitoring at the network level to determine the status of the user device.

32. The method of claim 31, wherein:

the particular functional component corresponds to at least one of a geographic location of the user device or a path of the user device;

monitoring the user device at the device level further comprises at least one of receiving location data or generating location data by a first process at the device level; and monitoring the user device at the network level further comprises at least one of receiving location data or generating location data by a second process at the network level.

33. A method for controlling device use, the method comprising:

receiving an instruction to control at least one functional component of a particular user device;

storing by a network-operable computing system a first state corresponding to a status of the at least one functional component of the particular user device at a network level;

storing by the particular user device a second state corresponding to the first state and corresponding to the status of the at least one functional component of the particular user device at a device level, wherein a particular application executable on the particular user device is configured to enable storing and modifying of the second state and controlling the at least one functional component at the device level;

controlling the at least one functional component at the device level when the particular user device is available via network communication by disallowing via the particular application installed on the particular user device at least one of initiating communication or receiving communication by the particular user device;

determining by the computing system a failure to communicate with the particular user device via the particular application via network communication; and modifying by the computing system the first state and controlling by the computing system the at least one functional component at the network level responsive to the instruction and responsive to determining the failure to communicate with the particular user device via the particular application, whereby a switch from the device level control to the network level control is implemented when there is the failure to communicate with the particular user device, and wherein the controlling the at least one functional component at the network level comprises signaling a telecommunication carrier system of a carrier network on which the particular user device operates, wherein communication at least one of to or from the particular user device is blocked by a processing element within the carrier network.

* * * * *